United States Patent
Fischer

(10) Patent No.: US 11,694,604 B2
(45) Date of Patent: Jul. 4, 2023

(54) ADJUSTABLE LIGHT-EMISSIVE ELEMENTS IN A DISPLAY WALL

(71) Applicant: Netflix, Inc., Los Gatos, CA (US)

(72) Inventor: Rhea Aylin Fischer, Los Angeles, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 17/238,508

(22) Filed: Apr. 23, 2021

(65) Prior Publication Data

US 2022/0343834 A1 Oct. 27, 2022

(51) Int. Cl.
*G09G 3/32* (2016.01)
*G09G 5/10* (2006.01)

(52) U.S. Cl.
CPC ............... *G09G 3/32* (2013.01); *G09G 5/10* (2013.01); *G09G 2300/026* (2013.01); *G09G 2360/141* (2013.01); *G09G 2360/145* (2013.01)

(58) Field of Classification Search
CPC ...... G09G 3/32; G09G 5/10; G09G 2300/026; G09G 2360/141; G09G 2360/145
See application file for complete search history.

(56) References Cited

U.S. PATENT DOCUMENTS

| | | | |
|---|---|---|---|
| 7,038,660 B2 | 5/2006 | Titcomb et al. | |
| 9,860,345 B1 | 1/2018 | Testa et al. | |
| 2014/0306966 A1 | 10/2014 | Kuo et al. | |
| 2015/0279037 A1* | 10/2015 | Griffin | G06F 3/1438 345/1.3 |
| 2016/0300394 A1* | 10/2016 | Fischer | H04N 21/2187 |
| 2017/0330495 A1* | 11/2017 | Doi | G06T 5/006 |
| 2018/0113320 A1* | 4/2018 | Lee | H10K 59/18 |
| 2018/0165051 A1 | 6/2018 | Kim et al. | |
| 2019/0004216 A1 | 1/2019 | Jeong et al. | |
| 2019/0004599 A1* | 1/2019 | Ikeda | G09G 5/00 |
| 2019/0335237 A1 | 10/2019 | Qin et al. | |
| 2020/0026110 A1 | 1/2020 | Pyo et al. | |
| 2020/0143772 A1 | 5/2020 | Huang et al. | |
| 2020/0233216 A1* | 7/2020 | Liesener | G06F 3/1423 |
| 2020/0293260 A1* | 9/2020 | Fitzgerald | G06F 3/0304 |
| 2021/0041718 A1* | 2/2021 | Balogh | H01L 33/58 |
| 2021/0110790 A1* | 4/2021 | Shigeta | H04N 9/3194 |

FOREIGN PATENT DOCUMENTS

WO WO-2020249236 A1 * 12/2020 ......... A61B 1/00009

OTHER PUBLICATIONS

Holben, Jay, "The Mandalorian: This Is the Way", American Cinematographer, Feb. 6, 2020, 44 pages.
(Continued)

*Primary Examiner* — Amare Mengistu
*Assistant Examiner* — Jennifer L Zubajlo
(74) *Attorney, Agent, or Firm* — Greenberg Traurig, LLP

(57) ABSTRACT

In some examples, a system includes a display wall comprising an arrangement of light-emissive elements and a controller, configured to receive camera data and to adjust a light emission profile of the arrangement of light-emissive elements based on the camera data. In some embodiments, the camera data may include camera location data. Various other methods, systems, and computer-readable media are also disclosed.

20 Claims, 14 Drawing Sheets

(56) References Cited

OTHER PUBLICATIONS

Seymour, Mike, "Art of LED Wall Virtual Production, Part One: 'Lessons from the Mandalorian'", downloaded from fxguide.com, Mar. 4, 2020, 18 pages.
Seymour, Mike, "Art of (LED Wall) Virtual Production Sets, Part Two: 'How you make one'", downloaded from fxguide.com, Mar. 9, 2020, 24 pages.
Seymour, Mike, "The Midnight Sky's Virtual Production using Stagecraft", downloaded from fx.com, Jan. 12, 2021, 11 pages.
Coldewey, Devin, "How 'The Mandalorian' and ILM invisibly reinvented film and TV production", downloaded from techcrunch.com, Feb. 20, 2020, 14 pages.
"Groundbreaking LED stage production technology created for hit Lucasfilm series 'The Mandalorian'", downloaded from ilm.com, Feb. 20, 2020, 3 pages.
"Black Pearl BP2 Led Display Brochure", downloaded from roevisual.com, Apr. 14, 2021, 2 pages.
"Black Pearl BP2 V2 Led Display Brochure", downloaded from roevisual.com, May 18, 2021, 2 pages.

\* cited by examiner

ADJUSTABLE LIGHT-EMISSIVE ELEMENTS IN A DISPLAY WALL

BACKGROUND

A display wall may be used to display a background image that acts as a backdrop to a stage. A recording of the stage, such as a film or video recording, may capture the stage environment set against the background image. The stage environment may include actors and various physical components. The background image may include any desired representation, such as mountains, other outdoor scenery, or buildings (exteriors or interiors). Display walls may provide various advantages over green screens that also allow background images to be added. For example, the background image may provide illumination for the stage environment, and the color balance and reflections from within the stage environment may be appropriate for the background image.

SUMMARY

As is described in greater detail below, the present disclosure describes improved display walls that may enable one or more of the following: improved background uniformity, improved illumination of the stage environment, improved image capture by one or more cameras, and/or improved energy efficiency.

In some examples, a system may include a display wall including an arrangement of light-emissive elements and a controller configured to receive camera data and to adjust a light emission profile of the arrangement of light-emissive elements based on the camera data. In some examples, the camera data may include camera location data. The controller may be configured to receive camera data from a camera positioned to capture light emitted by the display wall, and adjust a light emission profile of the arrangement of light-emissive elements based on the camera data. The camera location data may include a location of the camera relative to the display wall. The arrangement of light-emissive elements may include an arrangement of light-emitting diodes. The light emission profile may include one or more of a beam direction (e.g., a direction of maximum intensity), beam width, display brightness, or display color balance. In some examples, a display wall may include a plurality of display panels, such as LED display panels.

In some examples, the controller of a display wall may receive camera data, such as camera location data, and modify the light emission profile of at least a portion of the display wall based on the camera data. The camera may be directed towards a stage environment at least partially illuminated by the display wall. In some examples, the brightness of different portions of the display wall may be adjusted as the camera moves relative to the display wall. The camera may be directed towards a stage environment so that at least a portion of a display wall is within a field of view of the camera. The controller may determine the portion of the display wall that is within the field of view of the camera and increase the brightness of that portion of the display wall and/or decrease the brightness of portions that are outside the field of view of the camera.

In some examples, a system may include an actuator configured to adjust the light emission profile of the arrangement of light-emissive elements (e.g., a display panel or portion thereof) based on actuator control signals received from the controller. A system may include an actuator configured to adjust the light emission profile of the arrangement of light-emissive elements based on actuator control signals received from the controller. One or more actuators may be configured to adjust a light emission profile (such as the beam direction) of the arrangement of light-emissive elements. Beam direction may be adjusted by rotation of a panel along one or more axes, movement or other adjustment of one or more optical or electrooptical elements, or any suitable approach or combination of approaches. For example, an actuator may be configured to adjust an arrangement of optical elements relative to the arrangement of light-emissive elements, for example, based on the location of the camera relative to a display panel, and/or the orientation of the display panel relative to the camera.

In some examples, the controller may be configured to adjust the light emission profile of the arrangement of light-emissive elements (such as a display panel or portion thereof) to increase a detected light intensity parameter within the camera data. Camera data may include camera image data that identifies a portion of the display wall within a field of view of the camera, and the controller may be configured to increase a brightness of the portion of the display wall within the field of view of the camera. Camera data may include camera direction data which may be based on a direction of the camera relative to the display wall, and/or a camera zoom parameter which may be based on a zoom setting of the camera.

In some examples, a method may include: receiving, at a controller of a display wall, camera data from a camera directed towards a stage environment such that the display wall is at least partially within a field of view of the camera; and, using the controller, modifying a light emission profile of a portion of the display wall based on the camera data. The beam direction of light from an arrangement of light-emissive elements within the display wall may be adjusted to increase the brightness of an image captured by the camera. The orientation of at least one display panel of the display wall may be adjusted based on the location and/or direction of the camera relative to the display panel. In some examples, the brightness and/or color balance of at least a portion of the display wall may be adjusted based on an orientation of the portion of the display wall relative to the camera. In some examples, a method may be encoded as computer-readable instructions on a computer-readable medium. For example, a computer-readable medium may include one or more computer-executable instructions that, when executed by at least one processor of a computing device, may cause the computing device to modify the light emission profile of an arrangement of light-emissive elements within the display wall, such as beam direction, brightness or beam width.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
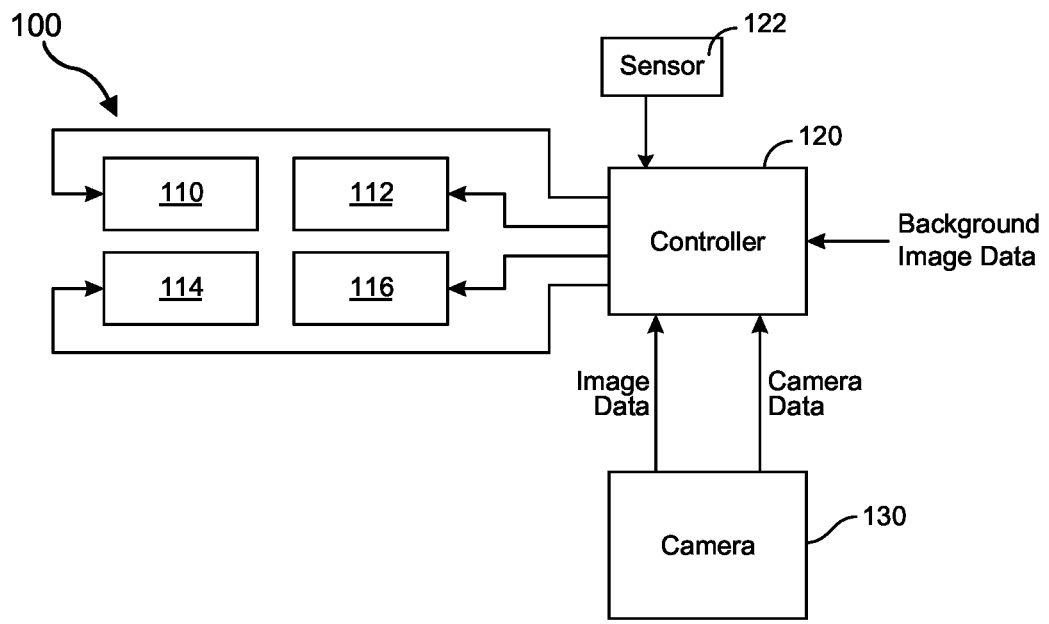
FIG. 1 shows a display wall including a plurality of display panels and a controller receiving camera data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to display walls having adjustable light emission properties that allow improved stage lighting, elimination of visual artifacts from the background image, and reduced heat generation from the display panels due to reduced light wastage. Examples may allow adjustment of the light emission from individual light-emissive elements and/or display panels to direct a greater proportion of light towards the camera.

In some examples, display walls may be used to display background images during film or video recording and may be used with a real-world stage. A camera may be used to record video images from the stage, including at least a portion of the background image. The stage may then appear to be located within an environment shown by the background image. For example, the background image may include an outdoors environment such as mountains or woodland, and the stage may then appear to be part of the outdoors environment. The background image may be computer-generated, based on previously obtained images or videos, or may be a combination of both real images and computer-generated images.

The display wall may be used to illuminate the stage, in which real-life actors and physical objects may be located. A camera may be located to record the stage environment and may produce a video signal (or film record) showing the stage environment with the display wall in the background. In some examples, it would be useful to increase the amount of light reaching the camera. Additional lights may be used, such as spotlights, but these may alter the color balance of the scene and create unwanted reflections inconsistent with the background image. Hence, modifying the light emission profile of the display wall to increase the amount of light reaching the camera would be very useful. In some examples, different portions of a display wall may have different light emission profiles selected to increase the light intensity received by the camera.

Examples of the present disclosure include a display wall with adjustable light emission properties that allow more light from the display wall to reach the camera. This may improve the lighting of the stage environment, and may further reduce wasted light, such as light from that display wall that does not reach the camera. The latter aspect may reduce the power demands of the display wall and reduce thermal problems such as overheating of the display wall.

Examples of the systems presented herein may include display walls having light-emissive elements with an adjustable light emission profile. The light emission profile (e.g., of an arrangement of light-emissive elements) may include one or more of the following: beam direction (e.g., the direction of maximum light emission intensity), color balance, brightness, beam width (e.g., relating to the angular distribution of emitted light intensity), or other suitable parameter. For example, the light emission profile of a display wall may be adjusted by reorienting one or more display panels and/or using optical elements to modify the light emission profile. The beam direction may refer to the beam center-line angle for light emission from a display pixel element. Beam direction may be modified by physical rotation of one or more display panels or portions of a display panel (such as one or more groups of emissive pixels). Beam direction may also be adjusted using one or more optical and/or electrooptical elements.

Adjustment of the light emission profile may be achieved using manual control or electronic control. Manual control may include adjustment of one or more display panel orientations, for example, using a handle. Manual control may also include adjustment of a portion of a panel, or reorienting a beam direction relative to a panel. The beam direction may be the beam centerline of light emission from a display panel or panel portion. Electronic control may include the use of actuators to adjust the orientation of display panels, panel portions, or optical elements, or electronic control of electrooptically adjustable optical elements. Electronic control may also include the adjustment of beam directions from a display panel, for example, by adjusting optical or electrooptical elements. These aspects are discussed in more detail below. The light emission profile of a portion of the display wall may be adjusted based on the location of the camera, for example, in relation to the position of the portion of the display wall. In some examples, the light emission profile of portions of the display wall may vary as a function of position within the display wall.

As is explained in greater detail below, embodiments of the present disclosure include display walls, such as light-emitting diode (LED) based display walls, including an arrangement of light-emissive elements having a light emission profile that may be adjusted using any suitable approach. In some examples, a system may include a controller configured to modify the light emission profile of a display wall, or portion thereof, based on camera data.

Camera data may include one or more of the following: camera location (e.g., relative to the display wall, or relative to the portion of the display wall for which a light emission profile is determined), camera height (e.g., relative to a reference height such as a floor), camera tilt (e.g., a tilt angle of a camera support), camera direction (e.g., pointing direction, which may be represented by azimuth and zenithal angles within a polar coordinate system, and may refer to the direction of the center of the field of view of the camera), camera settings (e.g., aperture, frame time, resolution, or speed), camera zoom parameter (which may be expressed as magnification or focal length), camera field of view (e.g., which may be determined from the camera zoom parameter or from image data from the camera), signal level data (e.g., image brightness at the camera), camera image noise data (which may be related to image brightness), camera motion (e.g., angular or translational speeds), or other camera data.

The display wall may be divided into portions, physically (e.g., as display panels or sub-panels) or electronically using the controller. For each portion, the controller may determine a light emission profile and may determine a light emission profile adjustment (relative to a present or unadjusted state) that increases the amount of light from the display wall that reaches the camera.

In some examples, the display wall may include an arrangement of display panels. The controller may determine a light emission profile for each panel (or, in some examples, group of panels). With no adjustment, the beam direction (e.g., direction of maximum light intensity) may be generally normal to the surface of a display panel. If the surface normal is directed away from the camera, then the controller may adjust the light emission profile so that the beam direction is generally directed towards the camera. This approach may include adjusting the orientation of a display panel (or sub-panel, if the display panel is divided into sub-panels), and/or modifying the optical properties of the panel so that more light is directed towards the camera. For example, the controller may receive camera data and modify a light emission profile (e.g., by adjusting a beam direction of light) of at least a portion of the display wall based on the camera data. This may include adjusting an orientation of at least one display panel within the display wall.

In some examples, a display wall includes an arrangement of light-emissive elements and a controller configured to receive camera data and adjust a light emission profile of at least a portion of the display wall based on the camera data. The camera data may be received from a camera positioned to capture light emitted by the display wall. The display wall may include one or more display panels, such as one or more LED display panels. The controller may adjust the light emission profile of an arrangement of light-emissive elements, such as one or more display panels, or a sub-panel of a display panel, based on the camera data. The light emission profile may vary as a function of position over the display wall, for example, based on the relative position of the camera relative to that portion of the display wall. For example, the beam direction may be adjusted by physical reorientation of a portion of the display wall, such as by adjusting one or more display panels. In some examples, aligning the beam direction from a portion of the display wall along a direction generally towards the camera may increase light intensity received by the camera. In some examples, light wastage may be reduced by narrowing the beam width (e.g., by narrowing the angular distribution of light intensity emitted by the arrangement of light-emissive elements relative to the beam direction, which may increase the intensity of light directed along the beam direction). Examples include steerable panels and the use of lenses or prismatic sheets to adjustably redirect and/or focus light from one or more light-emissive devices (such as LEDs), or one or more display panels. In some examples, the beam width represents an angular distribution of light intensity emitted by the arrangement of light-emissive elements, for example, as the full (or, e.g., half) angle between directions representing a half maximum intensity. The beam direction may represent a direction along which the light intensity is a maximum.

In some examples, camera data may include a detected light intensity parameter based on detected light intensity at the camera. The controller may be configured to adjust the light emission profile of an arrangement of light-emissive elements to increase the light intensity detected by the camera. An algorithmic approach may be used to increase the light intensity, such as an iterative algorithm used to determine the beam direction that gives the highest detected intensity of the detected light intensity at the camera.

In some examples, camera data may include field-of-view data that allows a determination of the portion of the display wall that is within the field of view of the camera. Field-of-view data may include an image captured by the camera and/or may include camera data such as camera location, camera direction, and camera zoom setting. The brightness of the portion of the display wall within the field of view of the camera (and optionally portions of the display wall within the field of view) may be increased relative to the other portions of the display. For example, the portion of the display wall within the field of view of the camera may be brighter than other portions not within the field of view.

In some examples, the light emission profile of at least a portion of a display wall may be adjusted using one or more actuators. For example, an actuator may be used to reorient one or more display panels (or portions thereof) in one or more directions (e.g., including a rotation along one or more axes). An actuator may be used to adjust the position and/or orientation of one or more light-emissive elements (such as group, row, column, or other arrangement of light-emissive elements). An actuator may be used to adjust the position and/or orientation of one or more optical elements (e.g., to adjust an arrangement of optical elements relative to the arrangement of light-emissive elements). In some examples, an electrooptic element may be used to adjust a beam direction. The beam direction may be modified by physical reorientation of a display panel or a portion thereof, and may also be modified by adjusting one or more optical or electrooptical elements (in some examples, without physical reorientation of the panel). The light emission profile, such as beam direction, may be adjusted using any described approaches or any combinations thereof. In some examples, phased array techniques can be applied to each color channel of the pixel element to modify the light emission profile. In some examples, the beam direction may be modified by reorienting pixel element emission angles within one or more panels or panel portions using any suitable approach.

Figure 3:
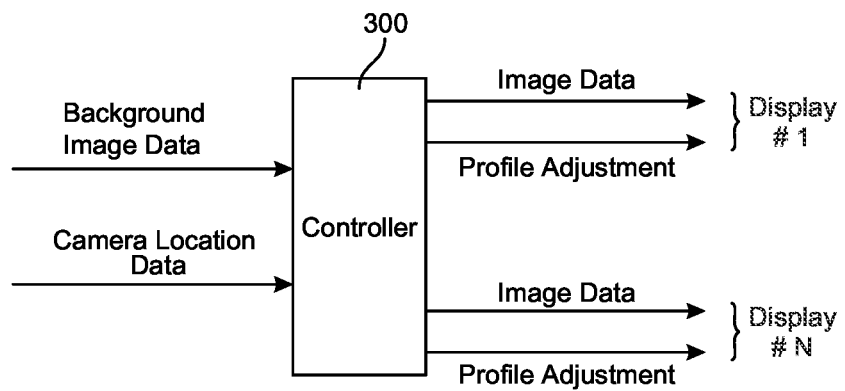
FIG. 3 shows a controller receiving camera data and an image signal and providing image data and light emission profile adjustment data to a plurality of display panels.
Figure 4:
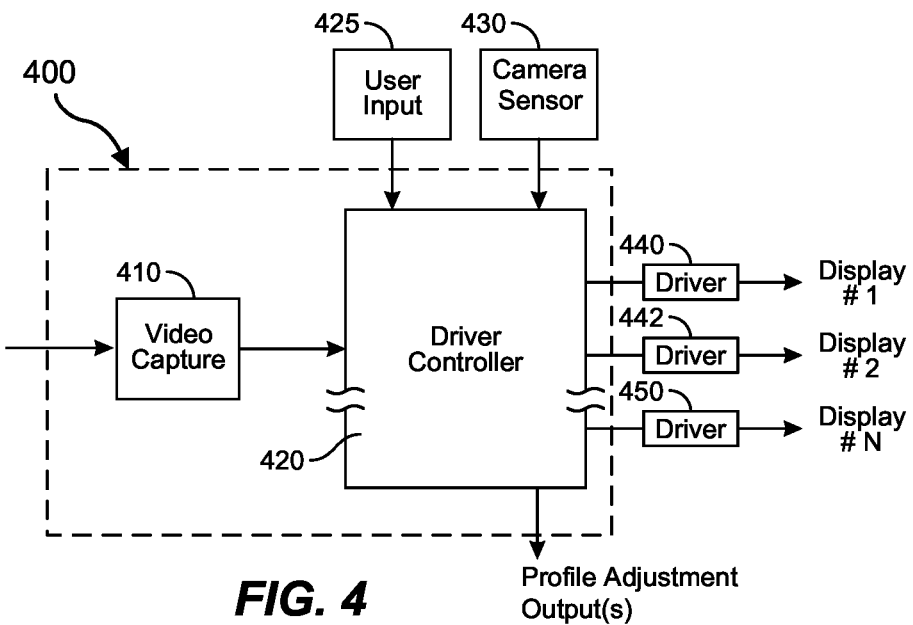
FIG. 4 shows a portion of an example controller including a driver controller and display drivers, with the controller being configured to receiving user data and camera data.
Figure 5:
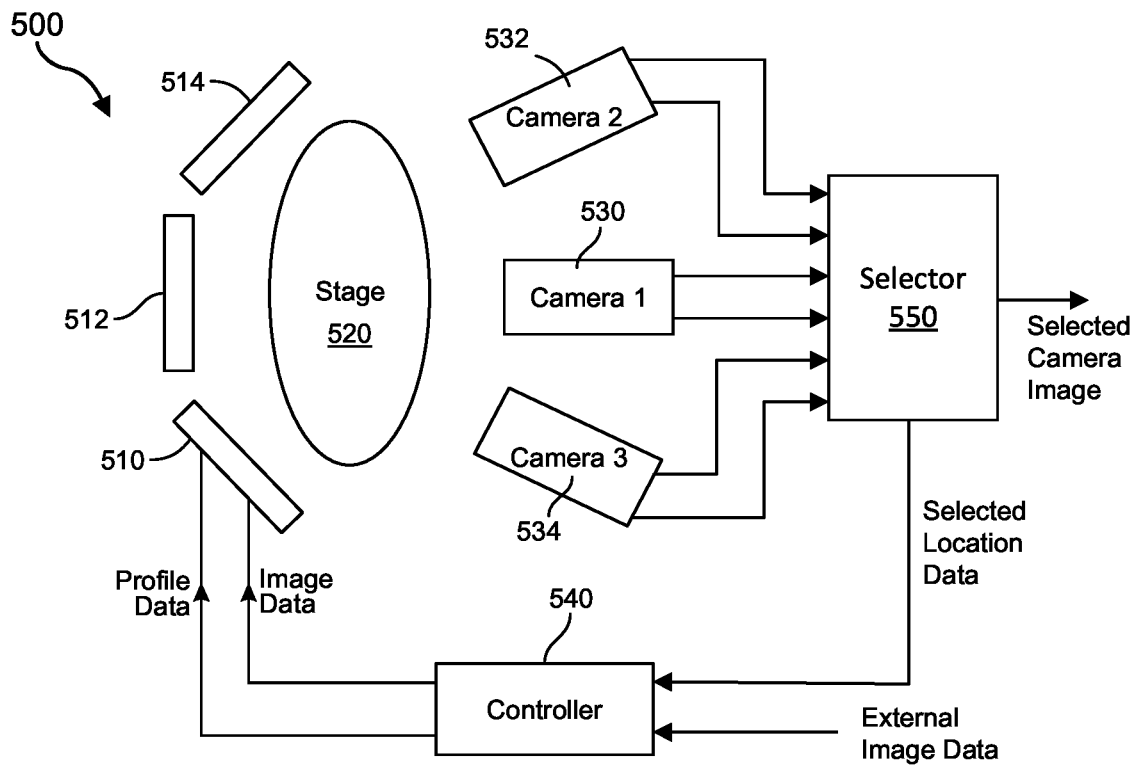
FIG. 5 shows an arrangement of cameras around a stage environment and a display wall.
Figure 6:
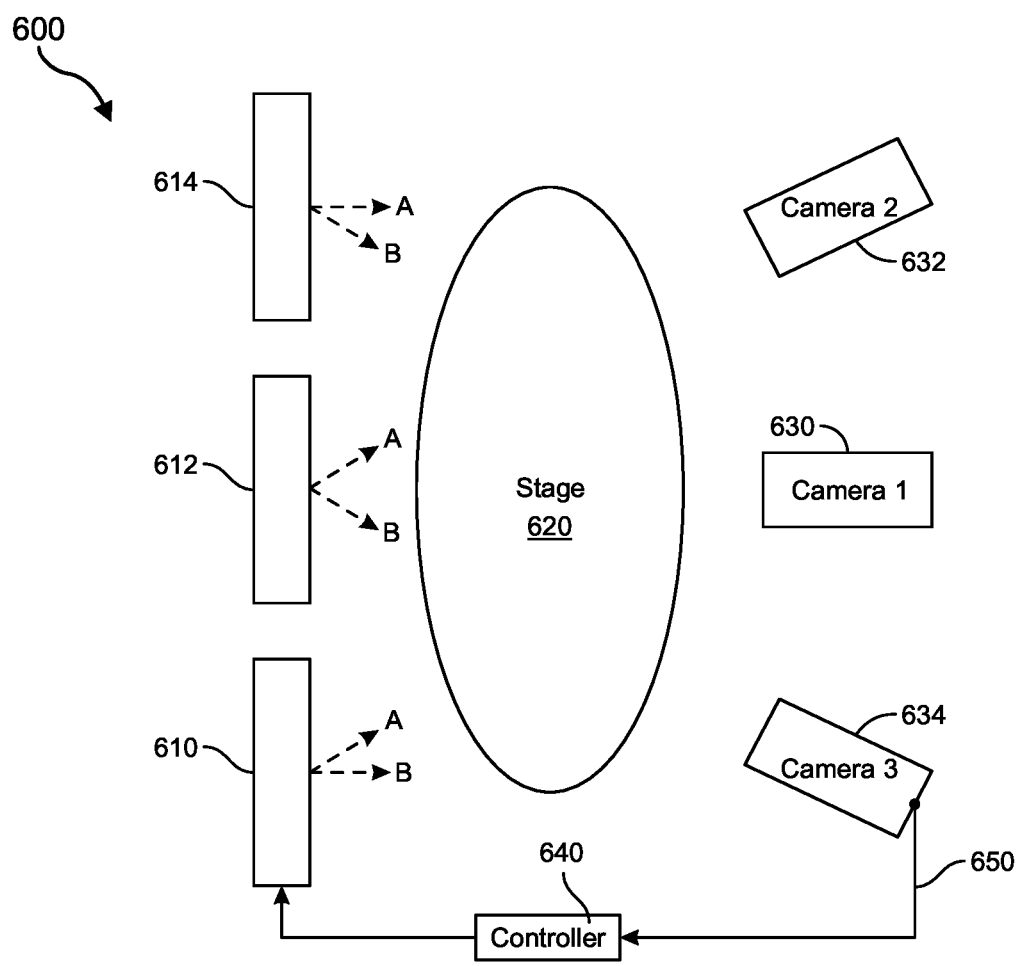
FIG. 6 shows an arrangement of cameras around a stage environment and a generally planar display wall.
Figure 7:
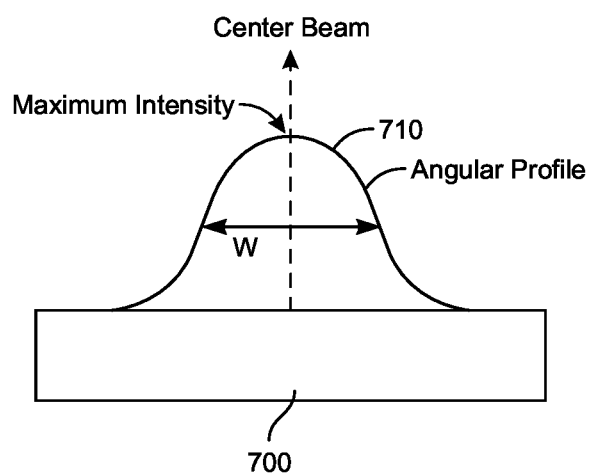
FIG. 7 illustrates a beam direction (the direction of the maximum intensity) and beam width for light emitted from an emissive element.
Figure 9A:
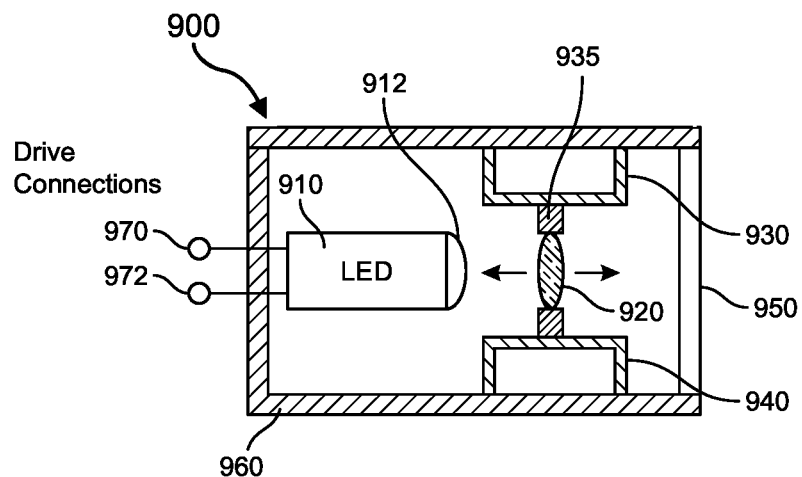
FIGS. 9A and 9B illustrate adjusting a beam width of a light-emissive element.
Figure 9B:
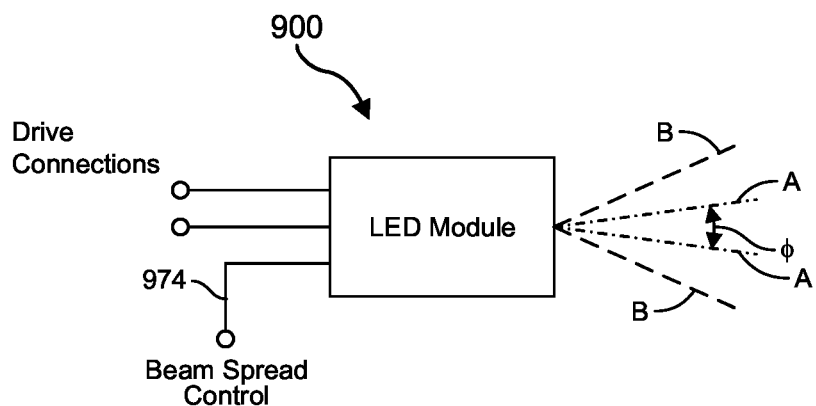
Figure 10A:
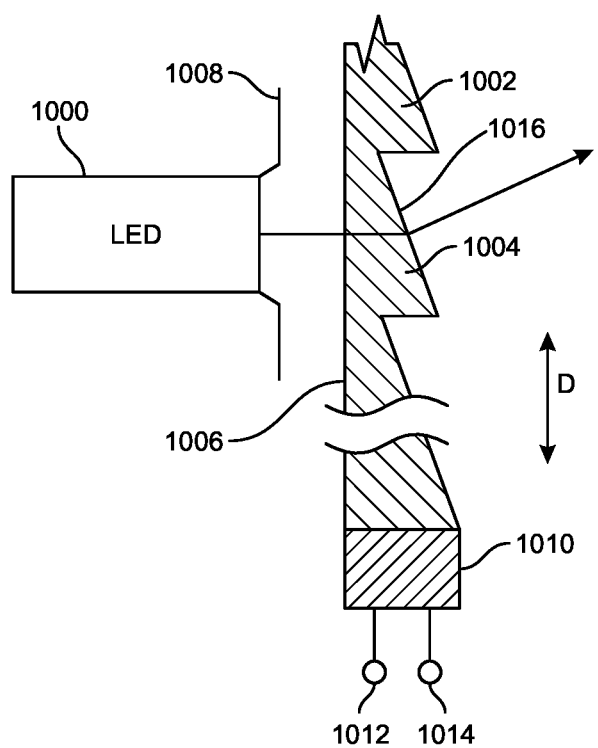
FIGS. 10A-10D illustrates arrangements of optical elements that may be used to modify a beam direction.
Figure 10D:
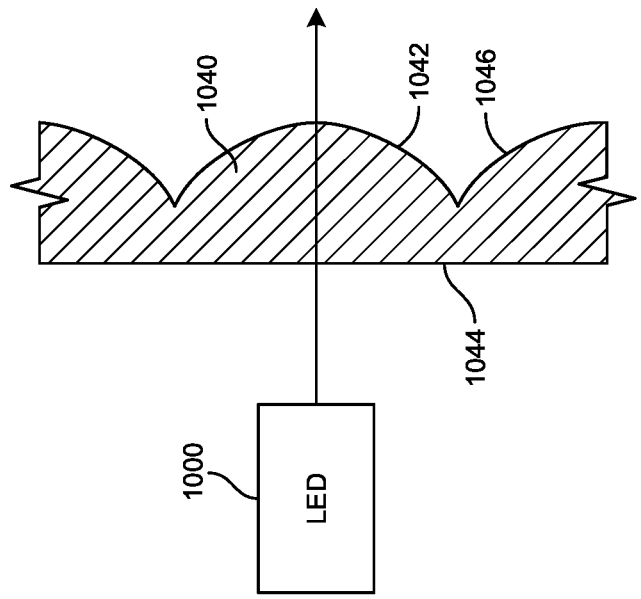
Figure 10C:
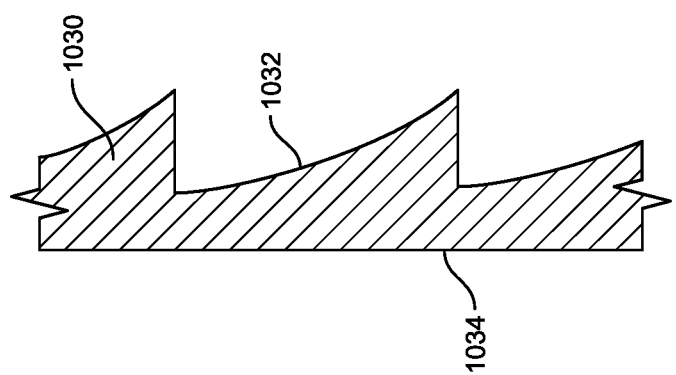
Figure 13:
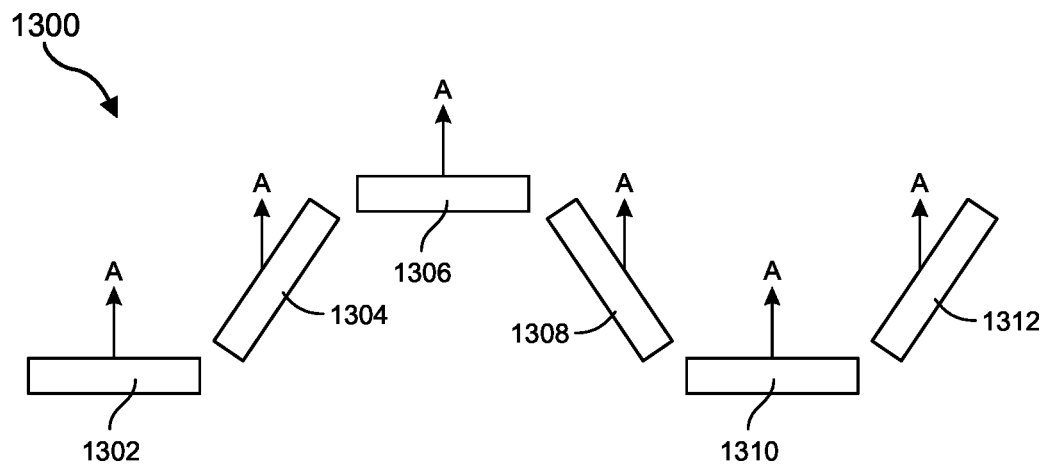
FIG. 13 illustrates an example arrangement of display panels in a display wall having improved acoustic properties.
Figure 14:
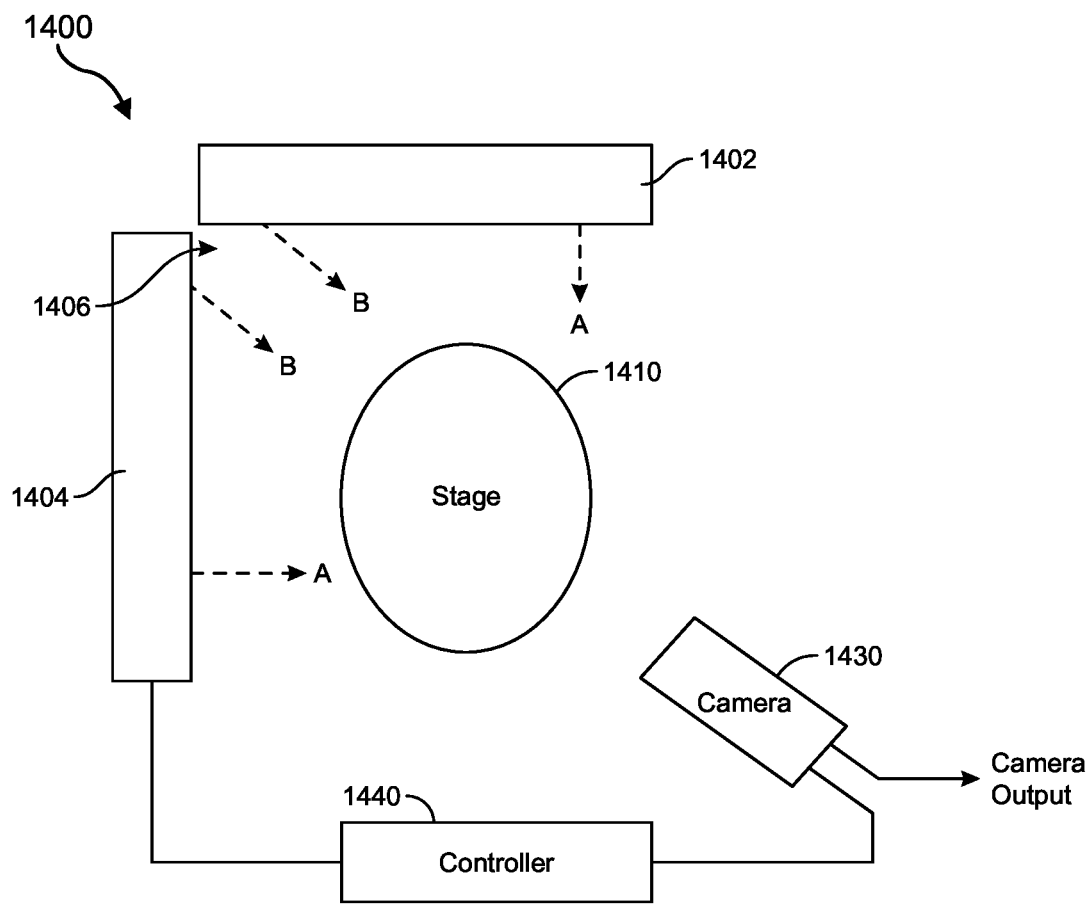
FIG. 14 illustrates improved illumination from a display wall including a corner configuration.
Figure 15:
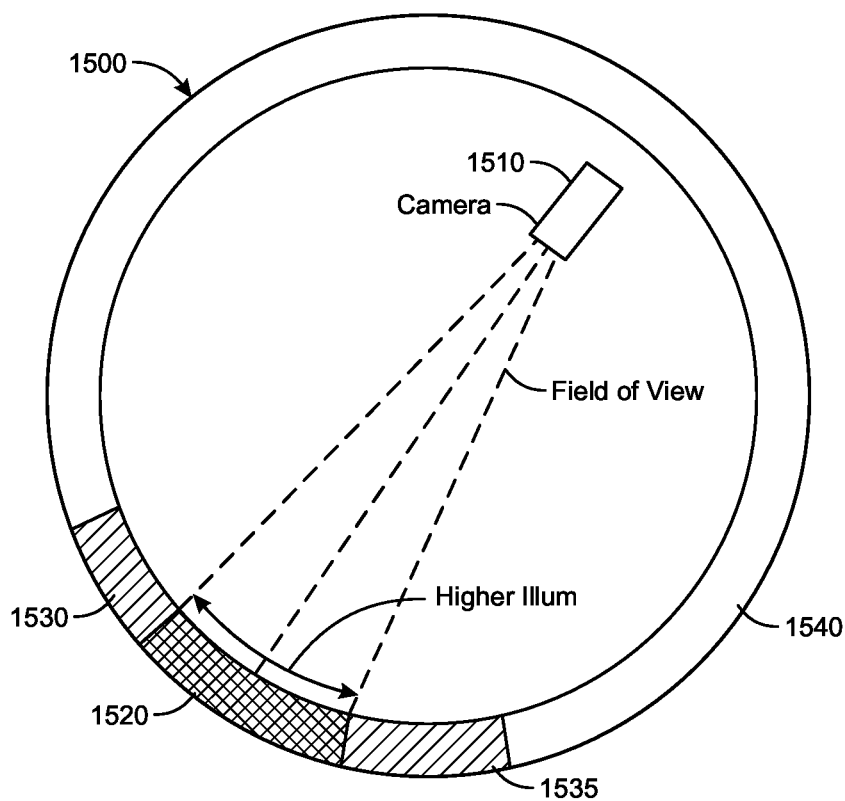
FIG. 15 illustrates a circular display wall and variation of illumination brightness based on camera location and direction.
Figure 16:
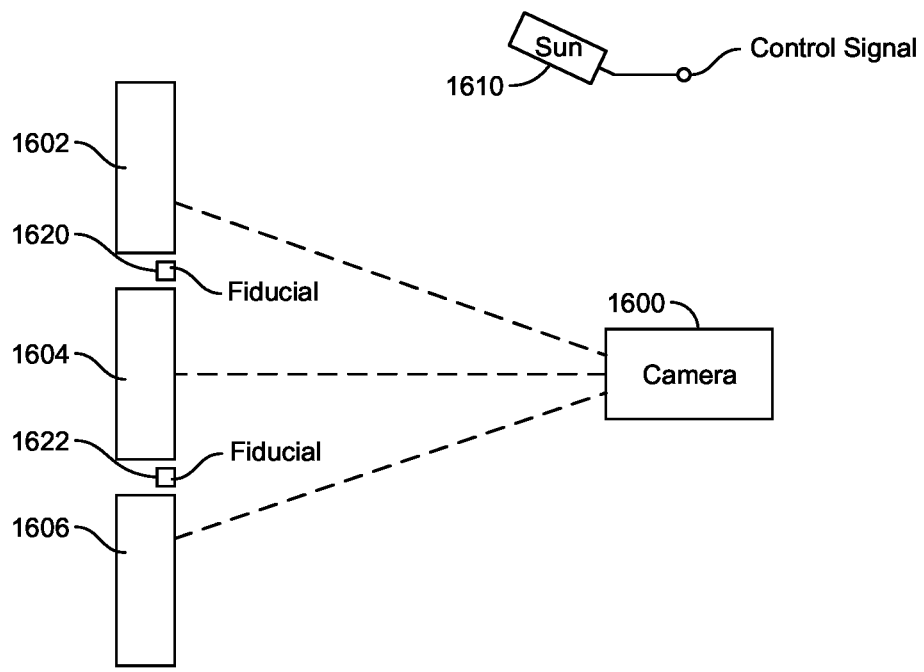
FIG. 16 illustrates the use of fiducials to help determine the location and direction of a camera.
Figure 17:
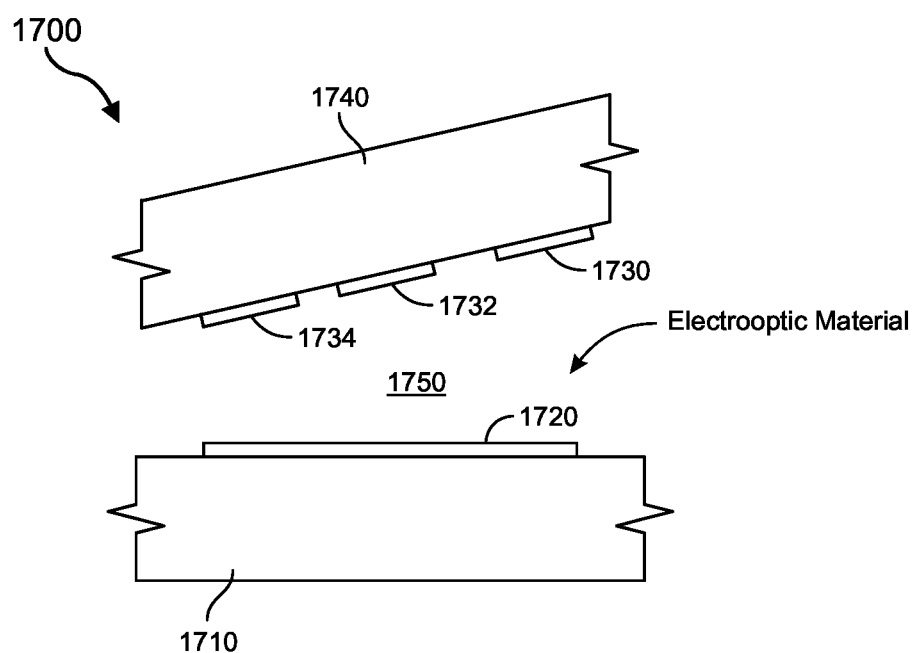
FIG. 17 illustrates a possible electrooptical element configured to provide adjustable beam direction.
Figure 18:
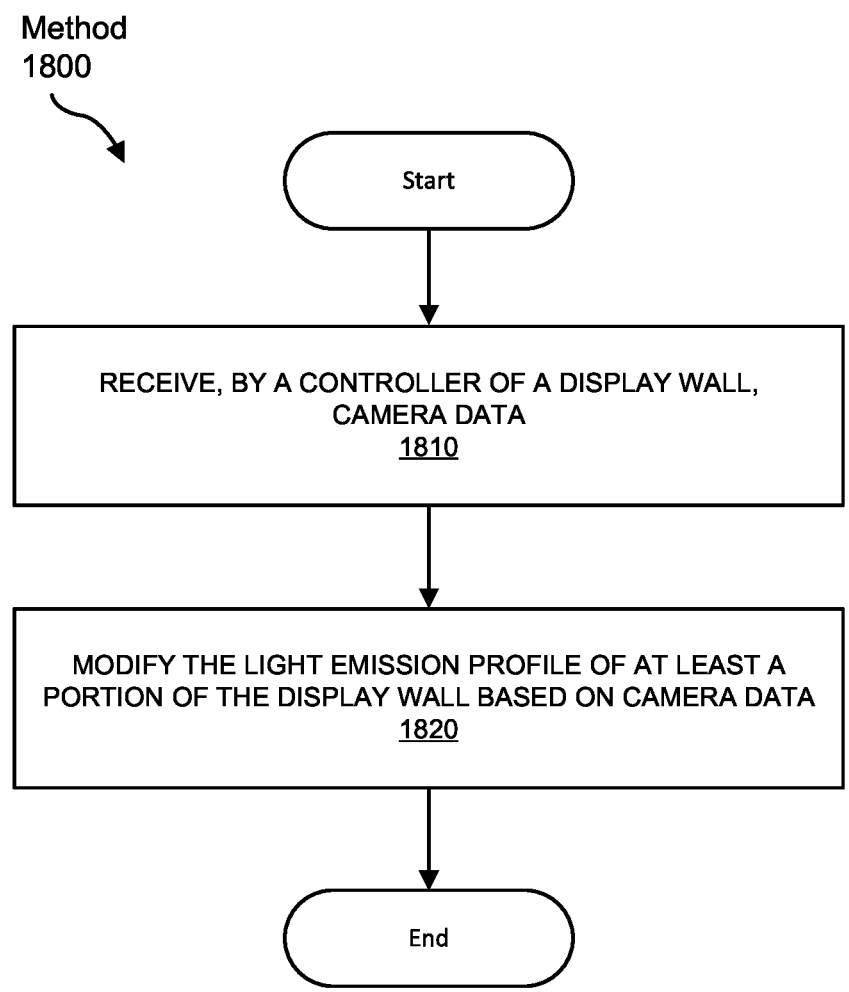
FIGS. 18 and 19 illustrate example methods.
Figure 19:
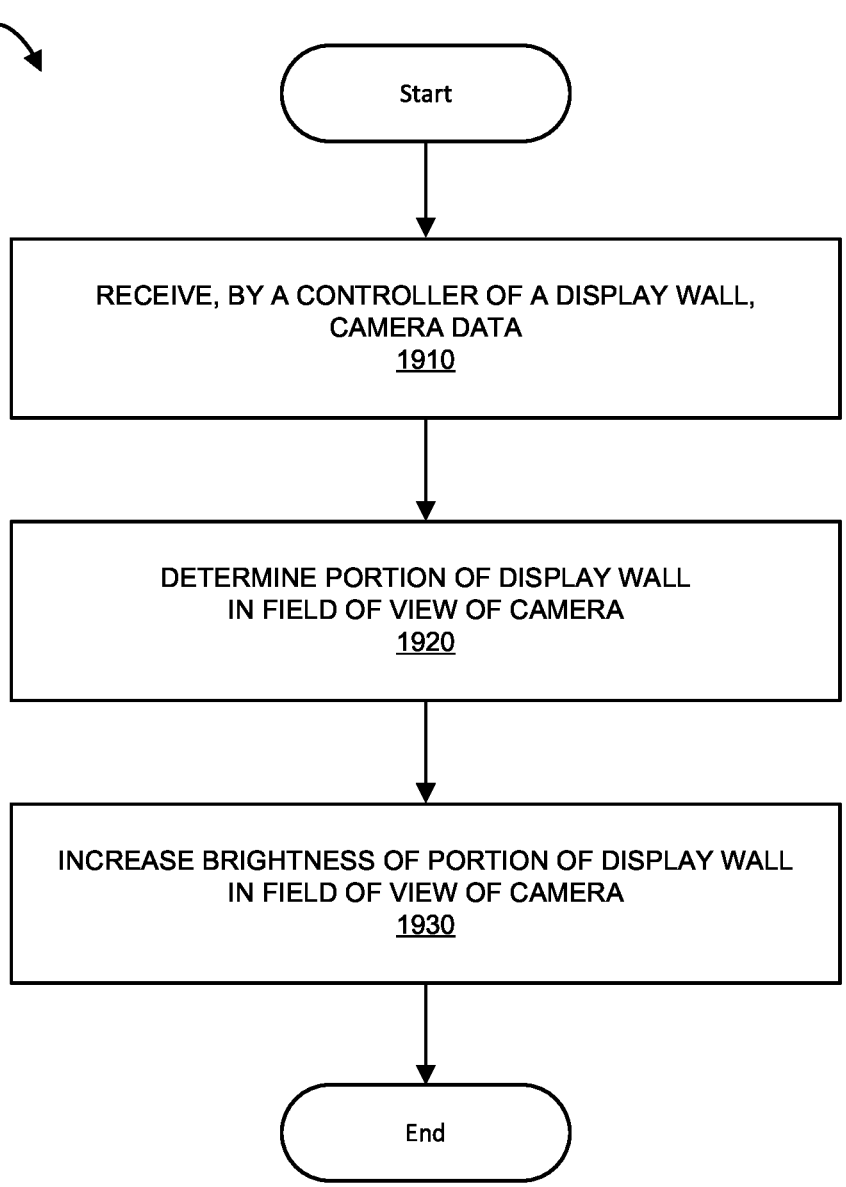

The following provides, with reference to FIGS. 1-19, detailed descriptions of improved LED walls, systems including LED walls, and their fabrication and use. FIG. 1 shows a display wall including a plurality of display panels and a controller receiving camera data, and along with FIGS. 2-4 illustrates example configurations and components of a display wall. FIGS. 5-6 show example arrangements of cameras around a stage environment and a display wall. FIGS. 7-8C illustrate adjustment of the beam direction, and FIGS. 9A and 9B illustrate the beam width. FIGS. 10A-11 illustrate electronic adjustment of the beam direction, for example, using optical elements. FIGS. 13-15 illustrate further possible display wall configurations. FIG. 16 illustrates the use of fiducials to determine the camera location from camera image data. FIG. 17 illustrates an example electrooptical element configured to provide an electronically adjustable beam direction, and FIGS. 18-19 illustrate example methods according to embodiments of the present disclosure.

FIG. 1 shows a display wall including a plurality of display panels and a controller receiving camera data. Display wall 100 may include a plurality of display panels (110, 112, 114, and 216) receiving control signals from controller 120. The controller 120 is configured to receive camera data (e.g., image data and location data from the camera) and background image data to show as the background image on the display wall. In some examples, the controller may receive sensor data from one or more sensors such as sensor 122. Sensors may include position sensors that provide position data related to the location of the camera, relative to the sensor or other reference point. Sensors, such as sensor 122, may include a radar sensor, image sensor, other optical sensor, or ultrasound sensor. Sensor 122 may include a directional sensor configured to a direction to the camera from the sensor location, and/or a distance sensor configured to determine a distance to the camera. One or more sensors 122 may be used to triangulate or otherwise determine the location of the camera.

A display wall may include any suitable number of display panels. FIG. 1 shows four display panels for illustrative convenience, though a display wall may include a much larger number of display panels.

Figure 2A:
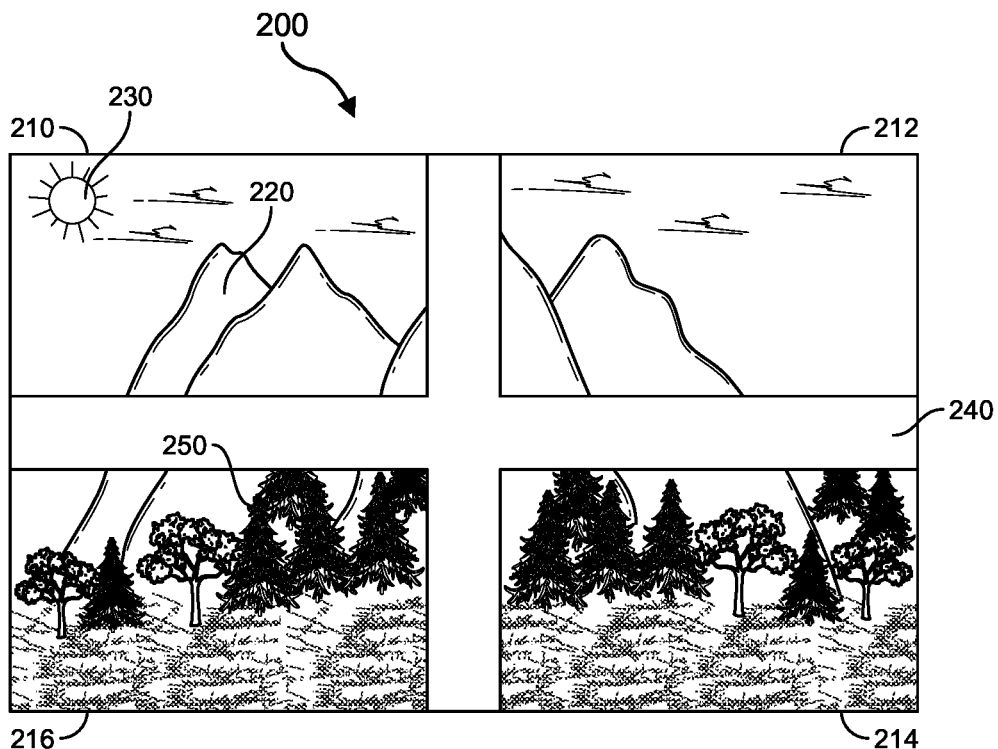
FIG. 2A shows an image displayed over a plurality of display panels within a display wall.

FIG. 2A shows an image displayed over a plurality of display panels within a display wall. The figure shows display wall 100 including display panels 210, 212, 214, and 216. The display wall 200 may be used to show an outdoors scene that may include mountains 220, the sun 230, and trees 250. As discussed further below, the sun (or other illumination source, such as the moon, a lightbulb, etc.) may be shown on the display wall, and the illumination may be augmented by an additional light source. Only four display panels are shown for illustrative clarity, but any suitable number of panels may be used. The panel gaps (240) are shown exaggerated, and in some examples there may be no visually perceptible gaps between background image portions shown on neighboring panels.

Figure 2B:
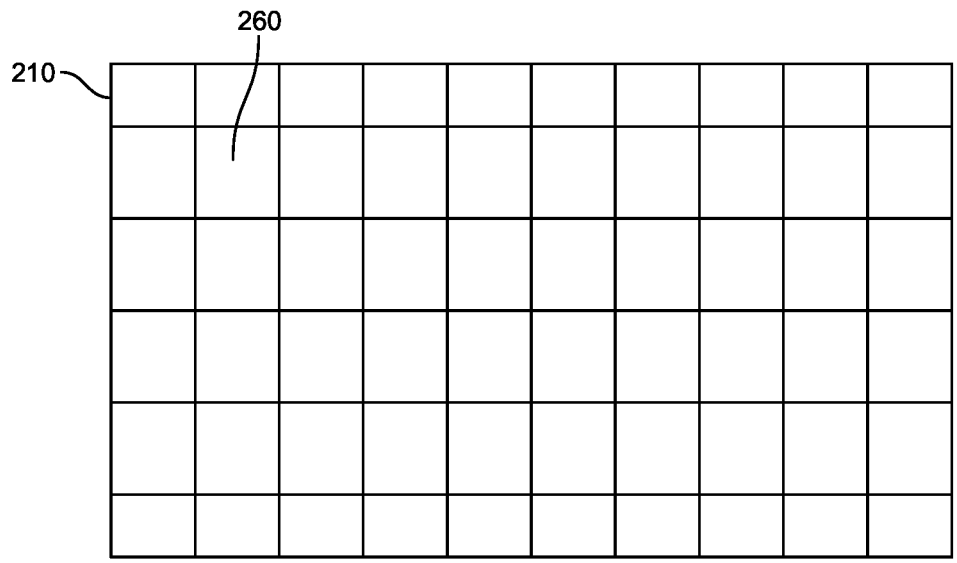
FIGS. 2B and 2C show example arrangements of light-emissive elements within a portion of a display wall.
Figure 2C:
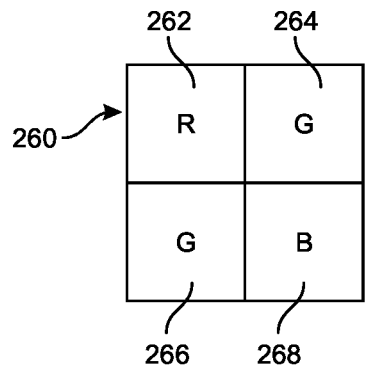

FIGS. 2B-2C show example arrangements of light-emissive elements within a portion of a display wall. FIG. 2B shows a portion of display panel 210, including an array of light-emissive elements 260. A square array is shown, but the light-emissive elements may have any suitable arrangement. FIG. 2C shows that a light-emissive element 260 may include sub-pixels (shown at 262, 264, 266 and 268) having different emission colors, in some examples R (red), G (green), and B (blue). In some examples, a pixel may include one or more emissive elements of each color, arranged in any suitable manner. Emissive elements may have any suitable shape, such as circular, square, or rectangular emissive surfaces. Sub-pixels may be arranged in any suitable manner, such as the configuration shown or any other suitable manner. A subpixel may be provided by, for example, a light-emitting diode of the appropriate color, a color filter in front of a white light source, or other suitable configuration. Emissive elements may include light-emitting diodes (LEDs). In some examples, a display panel may include any suitable display technology, such as a backlight in combination with, for example, a liquid crystal display panel. In some examples, emission parameters of a display panel may be adjusted by adjusting the light emission profile of a backlight or a portion thereof.

FIG. 3 shows a controller 300 configured to receive an image signal (e.g., conveying background image data to be displayed as the background image on the display wall) and camera data (e.g., camera location data). Upon receiving the image signal and camera data, the controller 300 may provide outputs to various portions of the display wall. For example, image data and profile adjustment data may be sent to each of the various display panels (e.g., the first display panel to the Nth display panel). The controller may divide the image represented by the image signal into background image portions displayed by each display panel. The controller may provide profile adjustment data to one or more arrangements of light-emissive elements. In some examples, profile adjustment data may be provided to one or more display panels. For example, a display panel may be rotated to provide improved illumination of the stage, in relation to the field of view of the camera, or the beam direction from light emitted from a display panel may be otherwise adjusted, for example, using one or more optical elements. Profile adjustment data may include data sent from the controller to facilitate a light emission profile adjustment and may include data displayed to a user (e.g., to help manual adjustment) or used to control one or more of an actuator, optical element, or electrooptical element to provide a desired light emission profile adjustment.

FIG. 4 shows a portion of an example controller including a driver controller and display drivers, with the controller being configured to receive user data and camera data. The controller 400 may include a video signal capture circuit 410, a driver controller 420, one or more drivers shown at 440, 442, and 450, and the controller 400 may receive signals from the user input 425 and the camera sensor 430. The video signal capture circuit 410 may receive a video signal representing the image to be displayed on the display wall and may send corresponding image data to the driver controller. The driver controller 420 may send video signals to each of one or more drivers, which in turn may send signals to each of the display panels. Each driver may be associated with one or more display panels.

The controller 400 may receive signals from user input 425, such as one or more user input devices associated with a computer that may be used to provide the controller circuit function. The controller 400 may also receive signals from camera sensor 430, which may include one or more of a camera position sensor, camera direction sensor, or a camera output (such as camera settings, or image level settings corresponding to the image captured by the camera). The controller may also provide one or more profile adjustment outputs, which may be used to adjust the light emission profile of one or more arrangements of light-emissive elements within the display wall, such as one or more display panels.

FIG. 5 shows an arrangement of cameras around a stage environment and a display wall. As shown, a display wall 500 may include wall portions 510, 512, and 514. Each wall portion may include one or more display panels. Three cameras 530, 532, and 534 are shown having different camera locations and different camera directions and arranged around a stage 520. Camera location and camera direction may be determined relative to one or more of the wall portions of the display wall or relative to any relatively fixed component within the stage environment. In the illustrated example, camera #3 (534) may be selected, and camera data including camera location data selected by selector 550 and provided to the controller 540. The controller may receive external image data which may correspond to a background image shown on the display wall. The controller may be configured to receive the camera data and provide background image data and profile adjustment data to each of the wall portions of the display wall. For illustrative convenience, only connections to wall portion 510 are shown. The light emission from wall portion 510 may be directed towards the camera providing the location data. If the camera selected is changed (or if the camera is moved to a different location), the change in location data may result in a change in profile adjustment data sent to the wall portions of the display wall. The controller may receive background image data, for example, image data corresponding to the background image to be displayed on the display wall 500. In some examples, only one camera is operational at any particular time, and the light emission profile of the display wall may be configured for the position of the operational camera. The selector 550 may receive camera image and location data from each camera, select one camera as the operational camera, output camera data from the selected camera, and provide location data to the controller for the selected camera. In some examples, only the selected camera may be turned on. In some examples, only one camera is operational at any particular time, and the light emission profile of the display wall may be configured for the position of the operational camera.

FIG. 6 shows an arrangement of cameras around a stage environment and a generally planar display wall. This is similar to the configuration and is described in a similar manner to the above paragraph. The figure shows a display wall 600 including wall portions 610, 612, and 614. Each wall portion may include one or more display panels. Three cameras 630, 632, and 634 are shown having different camera locations and directions and arranged around a stage 620. Camera location and camera direction may be determined relative to one or more of the wall portions of the display wall or relative to any relatively fixed component within the stage environment. In the illustrated example, camera #3 (634) is selected, and camera data including camera location data is provided to the controller 640. The controller is configured to receive the camera data and provide background image data and profile adjustment data to each of the wall portions of the display wall. For illustrative convenience, only connections to wall portion 610 are shown. In some examples, only one camera is operational at any particular time, and the light emission profile of the display wall may be configured for the position of the operational camera.

The light emission from wall portion 610 may be directed towards the appropriate camera location, using profile adjustment data provided by the controller. In this example, if camera #3 is in use, the beam directions from the wall portions may be shown by dashed arrows labelled "B". If the camera selected is changed to camera 2 (or if the camera 3 is moved to a location corresponding to illustrated camera 2), the change in location data may result in a change in profile adjustment data sent to the wall portions of the display wall. The beam direction may be adjusted to that of the dashed arrow labelled "A". The beam direction may be modified by reorienting or otherwise adjusting the angular distribution of emitted light from one or more panels or panel portions.

FIG. 7 illustrates a beam direction (the direction of the maximum intensity) and beam width for light emitted from emissive elements of a display wall 700. The angular profile of the emitted light (shown at 710) may represent emitted intensity versus emission angle (e.g., emission angle relative to a local normal to the wall portion), for example, from −90 degrees to +90 degrees. In some examples, the beam direction may be the direction of the center beam, or the direction of maximum emission intensity (these directions are the same for the illustrated emission angular profile). The beam width may represent the angular width of the beam, such as the full width at half height of an intensity versus angle plot. This is illustrated (qualitatively) as W and may be termed the angular width of the light emission from the display wall.

Figure 8A:
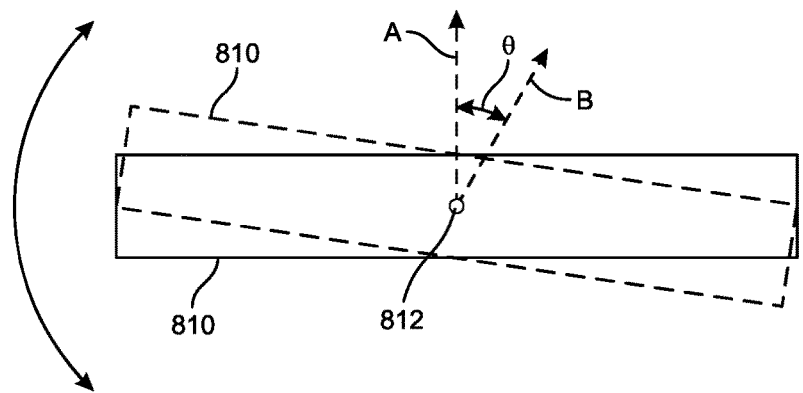
FIGS. 8A-8C illustrate configurations for modifying a beam direction by reorienting a display panel or a portion thereof.
Figure 8B:
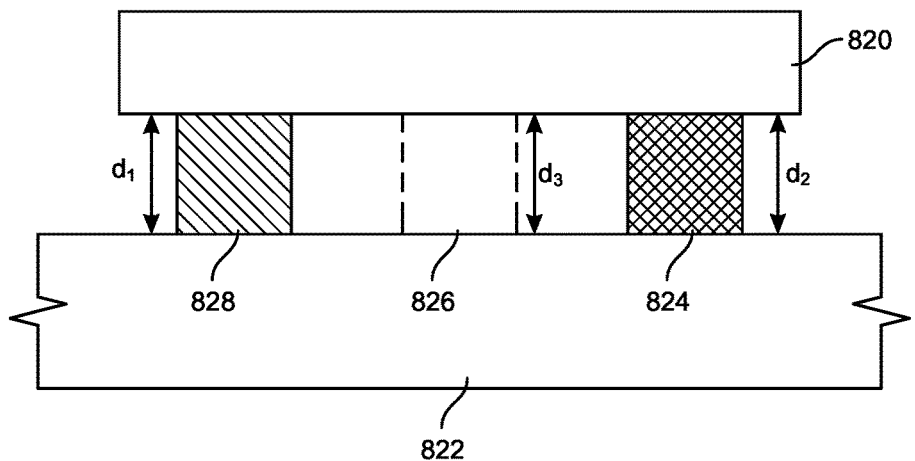
Figure 8C:
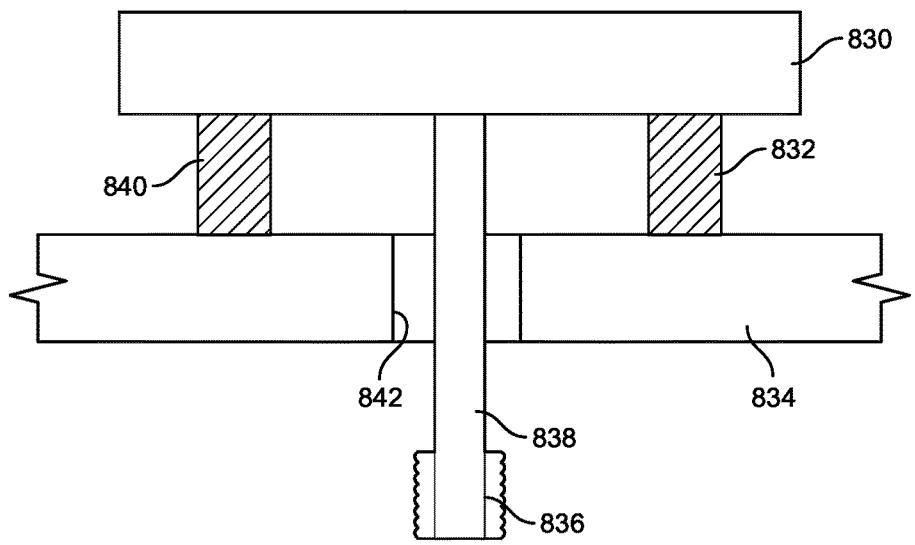

FIGS. 8A-8C illustrate configurations for modifying a beam direction by reorienting a display panel or portion thereof.

FIG. 8A illustrates, in general terms, an example device configuration allowing adjustment of the beam direction by mechanically adjusting the orientation of a display panel. The display panel 810 may be reoriented about a center of rotation 812. An original beam direction A may be reoriented to direction B, through an angle ($\theta$). The angular relationship between the beam direction and the normal to the display panel may remain unchanged. The change in beam direction may result from a change in the orientation of the normal to the display panel. The angular displacement may be within the horizontal plane, within the vertical plane, or within a combination of two orthogonal planes.

FIG. 8B shows a display panel 820 supported by three actuators (824, 826, and 828) relative to a backplane 822. The backplane may be a fixed component of a mechanical structure configured to support one or more display panels. The orientation of the display panel 820 may be adjusted by varying the displacement distances ($d_1$, $d_2$, and/or $d_3$) of supported portions of the panel relative to the backplane, using actuators 824, 826, and 828 respectively. The direction of a normal to the display panel may be adjusted by the actuators, using a signal from the controller. The controller and connections are not shown in this figure. The profile adjustment signal from the controller may include one or more actuator control signals. In some examples, an actuator may be configured to adjust the light emission profile of an arrangement of light-emissive elements based on actuator control signals received from the controller. The actuator may be configured to adjust the light emission profile of the arrangement of light-emissive elements based on actuator control signals received from the controller. One or more actuators may be used to adjust the orientation of a display panel, a portion thereof, or pixels or groups thereof.

FIG. 8C shows a configuration in which the normal to the display panel may be adjusted by hand, for example, by a user. The display panel 830 is supported by resilient and/or deformable supports (832 and 840) relative to a fixed backplane 834. A handle 838, including manual gripping portion 836, extends through a hole 842 in the fixed backplane 834 and allows the orientation of the display panel to be adjusted by hand. The fixed backplane 834 may be a component of a frame assembly configured to support a plurality of display panels.

In some examples, a user may be directed as to which adjustments to make using the output of a method such as described herein. In some examples, the controller may be configured to determine recommended adjustments and provide a notification to the user of those adjustments. In some examples, adjustments recommended for a display panel may be shown on the display panel.

In some examples, a display wall may have a set-up mode of operation, in which the controller may provide an indication (e.g., a visual indication) of a recommended orientation of the display panel. A user may manually adjust the orientation of one or more panels based on the recommended orientation. In some examples, the recommended orientation may be displayed on the display panel.

FIGS. 9A-9B illustrate adjusting a beam width of a light-emissive element.

FIG. 9A shows a light-emissive element 900 that includes a light-emitting diode (LED) 910, LED housing lens 912, and electrical connections 970 and 972 through which the LED may be energized. The light-emissive element may further include a beam spread lens 920 that may be translated within the housing within a lens adjustment assembly including lens mounts 930 and 940, along with lens holders such as lens holder 935 that may be translatable using an actuator or manually by a user. Light may exit the housing 960 through optional window 950, which may be omitted or which may be configured to further modify the light emission profile (e.g., by including a lens, such as a Fresnel lens).

In some examples, the beam spread lens 920 may include an optically transparent elastic material. In some examples, beam spread lens 920 may be adjusted by compression or tension applied between one or more actuators located within (or in place of) lens holders such as lens holder 935.

FIG. 9B shows that a light-emissive element 900, such as an LED module as illustrated in FIG. 9A, may include drive and ground connections for energizing an LED and may further include a beam spread control 974 that modifies the angular profile of the emitted light. The beam spread control may drive motion of the beam spread lens 920 within the light-emissive element to modify the angular profile of the emitted lens. The beam spread control signal may induce motion of an actuator, or electrooptic control of an electrooptic element such as a tunable lens. For example, in one operational mode, the light beam may have an angular profile denoted by the dashed lines "A" (having beam angular width $\phi$), and the beam spread control may modify the light beam to have an angular profile denoted by the dashed lines "B" (with a greater beam angular width). Beam spread may refer to the angular light distribution of light emitted by light-emissive elements, and in some examples may also be referred to as beam width.

FIGS. 10A-10D illustrates arrangements of optical elements that may be used to modify a beam direction.

FIG. 10A shows a light-emissive element 1000, in this example an LED within a display panel, emitting a light beam in a generally horizontal direction as illustrated, that may be approximately normal to the front face 1008 of the display panel. An optical element assembly 1002 provides one or more optical elements, such as optical element 1004, which in this example, is a generally wedge-shaped optical element having a planar surface 1006 and an oblique surface 1016 that refracts the emitted light along a modified direction. An optical element assembly may include a sheet having an arrangement of lenses, prisms, or other optical elements disposed thereon. The LED may emit light along a range of angles, and the illustrated beam direction may represent a center beam or principal beam of the emitted light, such as the direction of maximum emitted light intensity. The beam direction may be modified by the optical element 1004, which may be part of an array of optical elements. In some examples, the optical element may have a portion that does not significantly change the beam direction, such as a portion having a second surface parallel to the planar surface 1006. An electrically activated actuator 1010 with actuator connections 1012 and 1014 may be used to modify the location of the optical element 1002 relative to the display panel. The double-headed arrow denoted D represents example displacements of the optical element 1020 relative to the display panel. In some examples, the distance (separation) between the planar surface 1006 and the front face (1008) of the display panel may also be adjusted. In some examples, the optical element may be displaced, rotated, pivoted, or moved through any suitable combination of displacements and/or rotations relative to the front face 1008 of the display panel.

Figure 10B:
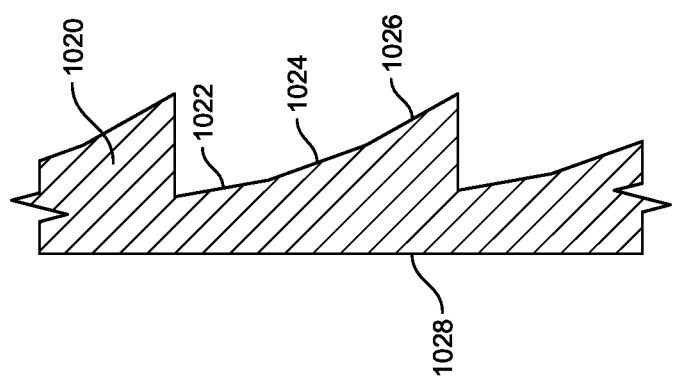
Figure 11:
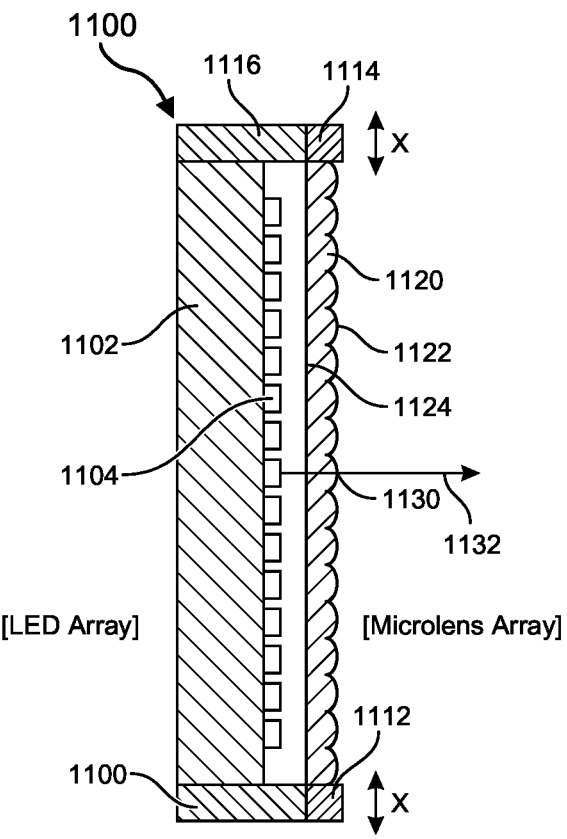
FIG. 11 illustrates a display panel (or a portion thereof) including a microlens array that may be used to modify a beam direction.

FIG. 10B illustrates an optical element 1020, which may be used in similar manner to the optical element 1002 in FIG. 10A. If the optical element is displaced vertically (as shown in FIG. 10A) the emitted light beam may pass through different facets (e.g., 1022, 1024 and 1026) of the oblique surface of the optical element 1020. Each facet may provide a different degree of angular displacement of the emitted light beam. In some examples, an optical element may include a facet that is parallel to the planar surface 1026 to provide an un-deviated light beam. An actuator may be used to displace the optical element 1020 relative to the display panel, thereby modifying the angular deviation of the light beam.

FIG. 10C shows an optical element 1030 similar to that shown in FIG. 10B, with a planar surface 1034, but with the faceted surface replaced with a curved surface 1032. In this example, as the optical element is translated laterally in relation to a light beam, the angular deviation of the light beam may vary continuously.

FIG. 10D shows a further example optical element 1040, which includes an arrangement of microlenses. The optical element 1040 may have a planar surface 1044 and a lens surface 1042. The optical element may include an arrangement of microlenses configured so that beam deflection may be obtained in one or both of orthogonal planes by adjusting the position of the optical element in one or both of orthogonal directions. The figure shows the beam from a light-emissive element 1000 passing through the center of the lens surface 1042, and not being deflected. However, if the position of the optical element is adjusted (e.g., using an actuator), the beam no longer passes through the center of the lens and may be deflected. The lens surface 1042 may include a circular or parabolic lens. Lenses may be arranged in an array, for example, including lens surfaces 1042 and 1046 spaced at intervals along one or more directions. In a no-deviation initial mode, a lens may be in register with each light-emissive element so no beam direction adjustment is obtained. Movement of the optical element, either using electronic control or by a user, may then deflect light emission from some or all optical elements.

In some examples, the lenses may be in register with light-emissive elements in some portions of a display panel and out of register in another portion of the display panel. This may be used to obtain a variable beam deflection from different parts of the display panel. This approach may be used to remove visual artifacts from near corners between panels, as further discussed below.

In some examples, lenses may be replaced with curved ribs, allowing adjustable beam deflection within a single plane only. In such examples, the lens surface 1042 may be a cross-section through an elongated rib, rather than through a lens. In some examples, the lens surface 1042 may include a concave surface.

FIG. 11 illustrates a cross-section of a display panel 1100 (or portion thereof) including a microlens array. The display panel 1100 includes a backplane 1102 supporting an arrangement of light-emissive elements 1104, which may include LEDs. A microlens array 1120 is supported in front of the light-emissive elements 1104 so that light from each light-emissive element passes through the planar surface 1124 and the curved optical surface 1122. FIG. 11 shows a representative light beam 1132 passing through the planar surface 1124 and the center of microlens 1130 and not being deviated. Actuators 1112 and 1114 may be configured to adjust the position of the microlens array, along one, two, or three orthogonal axes, thereby giving control over the angular deviation of the light beam 1132. A displacement of the microlens array (indicated by the double headed arrows labeled "X") results in the beam not going through the lens center and being deflected by an oblique portion of the curved surface of microlens 1130. The first and second actuators (1112 and 1114) interconnect the microlens array 1120 and the first and second actuator supports (1110 and 1116) respectively, which may provide the illustrative displacement, along with one or two orthogonal displacements, and/or tilt relative to the display panel.

Figure 12A:
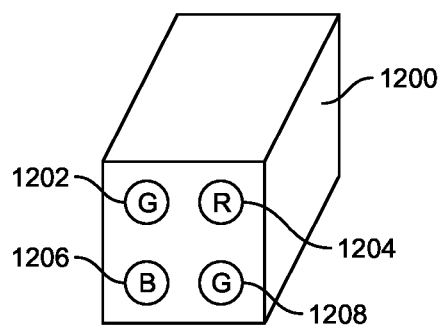
FIGS. 12A and 12B illustrate possible arrangements of light-emissive elements within a pixel of a display panel.
Figure 12B:
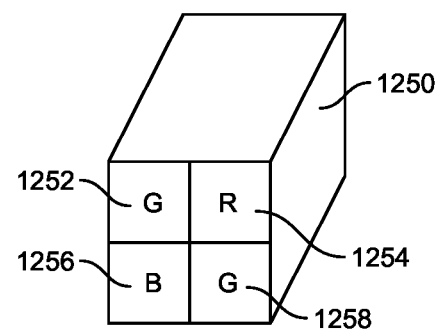

FIGS. 12A and 12B illustrate possible arrangements of light-emissive elements within a pixel of a display panel.

FIG. 12A shows a light-emissive element 1200 including multi-colored LEDs (1202, 1204, 1206, and 1208). LEDs within a display panel may be mini-LEDs or micro-LEDs. In some examples, the spacing between the LEDs may be small enough that there is no discernable difference in angular deviation through an optical element.

FIG. 12B shows a light-emissive element (1250) including a further possible arrangement of light-emissive components (1252, 1254, 1256, 1258), such as electroluminescent light emitters.

In some examples, a light emitter may include a color-tunable LED, which may have electrically controllable brightness and emission color. In some examples, a white light source (such as one or more LEDs, fluorescent lamps, or the like) may be used to illuminate electrically switchable light filters, such as LCDs. In some examples, a display wall may include LCD display panels having a backlight.

In some examples, a display panel may include an arrangement of light sources, such as a geometrical array of light sources. In some examples, a display panel may include a phased array of light sources. The beam direction from the light sources may be adjusted by controlling the relative phase of emissions from the light sources. In some examples, the direction may be adjusted in orthogonal directions, using, for example, a two-dimensional optical phased array.

FIG. 13 illustrates an arrangement of display panels in an example display wall having improved acoustic properties. The display wall 1300 includes wall portions 1302, 1304, 1306, 1308, 1310, and 1312. Neighboring wall portions have appreciably different orientations. For example, the angle between a neighboring portion may be at least 20 degrees and may be in the range 20-70 degrees, such as 30-60 degrees. The arrangement of wall portions may provide improved acoustic properties, for example, by not acting as a plane reflector for sound waves that may cause acoustic interference effects and perceptible echoes on the stage. The beam direction (e.g., direction of peak illumination brightness) for each panel may be adjusted so that the beam directions are generally parallel, as illustrated by the parallel arrows denoted "A". In this and other examples, each wall portion may include one or more display panels along the width and/or height of the wall portion. In some examples, the beam directions denoted by the arrows denoted "A" may be further adjusted based on camera position.

In some examples, the brightness of a wall portion that is oblique to the camera view (e.g., wall portion 1304 or 1308) may be increased relative to the brightness of a wall portion that may be generally square on to the camera (e.g., wall portion 1306, assuming the camera direction is along the arrow A). An increase in brightness of oblique wall portions may be used to obtain a generally uniform display wall brightness within a camera image.

FIG. 14 illustrates improved illumination from a display wall having a corner configuration. In this configuration, the display wall 1400 includes wall portions 1402 and 1404 that meet at a corner region 1406. Using conventional wall portions, the background image within the corner region 1406 may be darker than the surrounding background image, creating a visual artifact. In some examples, the beam directions within the corner regions 1406 may be modified to be directed along directions indicated by arrows B. This light is generally directed towards the stage 1410 and the camera 1430, increasing the brightness of the background image within the corner region 1406. A controller 1440 may be configured to adjust the beam directions (labelled A or B) based on the position of the camera 1430. However, the modifications to the light emission profiles within the corner region provides benefits independent of the ability to further modify the light emission profiles. A corner configuration may include a corner between two generally vertical display wall portions, and/or a corner between a vertical display wall portion and a horizontal display wall panel (e.g., a floor or a ceiling), or between two or more display wall portions having different orientations.

In some examples, an LED wall may be used for at least a part of a wall, floor, and/or ceiling of a stage environment. An LED wall used as a ceiling portion may display a sky, clouds, lightning, other atmospheric phenomena, one or more celestial bodies such as a star, flying vehicle, space vehicle, satellite, or any other appropriate image. Light emission profiles from at least a portion of the sky, such as relatively brighter portions, may be optimized for a particular camera position. An LED wall used as a floor portion may show a constructed floor, ground, water feature, or any other appropriate image. In some examples, background images may rotate through floors, walls, and/or ceilings, for example, if the stage environment represents a portion of a rotating object or vehicle. LED floors may particularly benefit from the approaches described in this application if the camera is at an acute angle to the floor, as otherwise much light emission may be wasted. Illumination from the floor may be preferentially directed towards the camera to increase image brightness.

FIG. 15 illustrates a circular display wall, and variation of illumination brightness based on camera location and direction. In this example, the display wall 1500 has a generally circular shape, though other shapes may be used such as arcuate shapes that are not complete circles, parabolic shapes, planar shapes, polygons, or other suitable shapes. Display panels may be curved, or the circular shape may be approximated by a polygon formed of generally flat display panels or display wall portions. A camera 1510 is located within the display wall. Using the location and direction of the camera, and/or using the portion of the background image captured by the camera, a display wall controller (not shown for illustrative clarity) may adjust the brightness of a portion of the background image within a field of view of the camera. For example, a high brightness portion 1520, within the field of view of the camera, may have a relatively high brightness (e.g., compared to other portions). Intermediate brightness portions 1535, adjacent the high brightness portion 1520, may have an intermediate brightness, between high and low brightness. A low brightness portion 1540, well outside the field of view of the camera, may have a relatively low brightness. The portion having the highest brightness may be dynamically adjusted based on changes in one or more of following: the location of the camera; the direction of the camera; the zoom setting of the camera (or similar parameter, such as focal length), or the image captured by the camera (e.g., the portion of the background image captured by the camera). For example, the angular width of the high brightness portion may be expanded if the camera zooms out and captures more of the background image.

In some examples, the display wall portions such as panels may not be physically adjustable, and the panels may have a brightness that may vary based on the panel orientation relative to the camera. For example, a display panel that is square-on to the camera (e.g., having a panel surface normal that is directed to the camera) may have a particular brightness, and a display panel at an oblique angle to the camera (e.g., an appreciable angle between the panel surface normal and the direction to the camera) may have a higher brightness (relative to the particular brightness). Without adjustment of the beam direction, pixel emission brightness may fall off away from normal viewing, and this may be compensated for by increasing the panel brightness. In some examples, a side (oblique) panel may have a higher brightness than a center panel that directly faces the camera. Even if the panels are not physically adjustable, the emission profile (e.g., color and/or brightness) of pixel elements of the display panels may be adjusted based on the orientation of the display panel relative to the camera.

In some examples, the controller may be configured to increase a brightness of a portion of the display wall that is within a field of view of the camera and/or decrease a brightness of a different portion of the display wall that is outside a field of view of the camera.

In some examples, the controller may be configured to increase a resolution of the background image within the portion of the display wall that lies within the field of view of the camera and/or to decrease the background image resolution for at least one different portion of the display wall that lies outside the field of view of the camera. The image processing burden for rendering the background image on the display wall may be appreciably reduced by only providing a high-resolution image display within the portion of the display wall that contributes to the image captured by the camera. Portions of the display wall that lie outside the field of view may show the background image with a lower resolution, for example, a resolution of 50% or less than the high-resolution image display. The low-resolution display of the background image may allow one or more of the following benefits: an appropriate stage lighting color balance, visually acceptable reflections from objects within the stage environment, and/or visual guidance for actors within the stage environment. However, even while retaining one or more of these benefits, the low resolution display of the background image outside the field of view of the camera may provide a significant reduction in the processing burden for the controller, compared with showing the background image at high resolution over the full display wall. The terms high resolution and low resolution may be relative terms. For example, high resolution may be the native resolution of the display wall. Low resolution is a lower resolution than the high resolution, and low resolution may lead to a visually appreciable reduction in image sharpness for portions of the background image outside the field of view of the camera.

FIG. 16 illustrates the use of fiducials to help determine the location and direction of a camera. In some examples, fiducials 1620 and 1622 may be located between display panels 1602 and 1604, and between display panels 1604 and 1606, respectively. A camera 1600 may capture a field of view including one or more fiducials, and the fiducials may be used to determine the field of view of the camera. A fiducial may provide an identifiable image element, such as a colored spot, a distinct shape, or other identifiable aspect. Each fiducial may include an identifiable appearance aspect, such as color, shape, flicker pattern, or other aspect. As the location, direction, and/or zoom setting of the camera changes, the number and types of fiducials may change and the location of the camera may be determined. A controller may then appropriately modify the light emission properties of the video wall.

In some examples, the location (and/or direction) of the camera may be determined from the field of view of the camera. The field of view of the camera may be determined by image data obtained from the camera.

FIG. 16 also illustrates the combination of a display wall with an additional lighting element 1610, labeled "Sun". The additional lighting element may be used to obtain shadows and other indications of directional light within a stage environment. In some examples, the location of the sun may be adjusted in an analogous manner to that of light-emissive elements in the display wall, for example, to increase the light levels at the camera. The controller may also control the intensity, color balance, and/or beam direction from one or more additional lighting elements (e.g., one or more of a sun, moon, streetlight, floodlight, or other light source). For example, light from the sun may have an increased proportion of red light when the sun is located at lower elevations (e.g., relative to the horizon as represented within a background image).

FIG. 17 illustrates a further possible optical element, in this example an electrooptical element configured to provide adjustable beam direction. The optical element 1700 includes transparent substrates 1710 and 1740, and transparent electrodes 1720, 1730, 1732 and 1734. In some examples, the volume between the electrodes may include an electrooptical material 1750, such as a material having an electrically controllable refractive index. Example electrooptical materials include liquid crystals, electrooptical crystals, and the like. The deviation of the beam may be adjusted using electrical control of the effective refractive index for light passing through the optical element. This approach may be combined with other approaches, such as mechanical adjustments and/or the use of additional optical elements.

FIG. 18 illustrates an example method (1800) that may include (1) receiving, at a controller of a display wall, camera data from a camera (1810), where the camera may be directed towards a stage environment such that the display wall is at least partially within a field of view of the camera and (2) modifying the light emission profile of at least a portion of the display wall based on the camera data (1820). Modifying a light emission profile of the at least a portion of the display wall may include adjusting a beam direction of light from an arrangement of light-emissive elements within the display wall by, for example, adjusting an orientation of at least one display panel of the display wall. In some examples, the light emission profile may be adjusted based on camera location data.

FIG. 19 illustrates a further example method (1900) that may include: receiving, at a controller of a display wall, camera data from a camera (1910), where the camera may be directed towards a stage environment such that the display wall is at least partially within a field of view of the camera; determining the portion of the display wall that is within the field of view of the camera (1920); and, using the controller, increasing a brightness of the portion of the display wall that is within the field of view of the camera (1930).

In some examples, one or more of brightness, beam direction, and display wall resolution may be adjusted based on camera data, such as camera location data. In some examples, the controller may increase the brightness and/or resolution for a portion of the display wall within the field of view of the camera, and/or reduce the brightness and/or resolution for one or more portions of the display wall that is not within the field of view of the camera. If an object within the stage environment blocks part of the display wall from the camera, the blocked part may, in some examples, be considered as not within the field of view of the camera.

Modifying a light emission profile of a portion of the display wall may include adjusting one or more profile parameters related to light produced by the portion of the display wall, such as one or more of the following parameters: beam direction; panel orientation, wall portion orientation, beam width (e.g., beam angular profile); brightness; color balance; flicker rate; or any other suitable parameter.

In some examples, a display wall may include a plurality of display wall portions that may be removably attached to the floor, wall, and/or ceiling of a room, such as a stage environment. In some examples, a display wall may include display wall portions having different orientations. In some examples, the overall light emissive area of a display wall may be at least than 10 square meters, and may be greater. In some examples, a display wall may include a plurality of display panels, where each display panel has a diagonal dimension of at least 16 inches.

In some examples, a method may include (1) receiving, at a controller of a display wall, camera data from a camera directed toward a stage environment such that a portion of the display wall is within the field of the camera and (2) modifying a light emission profile of the portion of the display wall based on the camera data, such as camera location data. In some examples, a method may include determining the portion of the display wall that is within the field of view of the camera, and, using the controller, increasing a brightness of the portion of the display wall that is within the field of view of the camera. The camera data may include camera location data related to the location of the camera relative to the display wall. Modifying a light emission profile of at least part of the display wall may include adjusting a beam direction of light from an arrangement of light-emissive elements within the display wall. In some examples, a method may include directing a camera towards a stage environment at least partially illuminated by a display wall, providing camera data to a controller of the display wall, and, using the controller, modifying a light emission profile of at least a portion of the display wall based on the camera data.

In some examples, the display wall may have a set-up mode during which light emission profiles from the display wall may be adjusted. During the set-up mode, the controller may receive image data from the camera and perform one or more of the following operations: adjust the light emission profile (e.g., beam direction and/or beam width) of light-emissive elements within the display wall to increase light levels at the camera, increase or reduce light emission brightness to reduce power consumption while maintaining a threshold light level at the camera; adjust illumination levels for different portions of the display wall to increase lighting efficiency (e.g., to reduce brightness of wall portions that fall outside the field of view of the camera and/or increase the brightness of display wall portions that fall within the field of view of the camera); or display (or otherwise announce) adjustments that may be manually performed (e.g., manual rotation of display panels).

In some examples, the camera data may include one or more of: camera location data related to the location of the camera relative to the display wall or a portion thereof; camera direction data related to the direction (or orientation) of the camera, for example, in relation to the orientation of a portion of the display wall; zoom data related to the zoom setting (or magnification) of the camera; light level data related to the light level at the camera (e.g., light levels at one or more percentiles of a light level distribution); color balance (e.g., related to the color balance of the light received by the camera; or other camera data. Light level data may be determined based on an analysis of the spatial brightness distribution of image data.

In some examples, a method includes determining a portion of the display wall that is within the field of view of a camera and, using the controller, selectively increasing the brightness of the portion of the display wall that is within the field of view of the camera, for example, while maintaining or lowering brightness of different portions of the display wall.

In some examples, a method may include sending camera data from the camera to the controller of the display wall. Camera data may include one or more of the following: location data, direction data, zoom data, a light intensity level at the camera, or other data or combination of data. Light intensity level data may be based on brightest portions and/or dimmest portions of an image detected by the camera, or some combination or average thereof.

In some examples, light intensity at the camera may be expressed as a light intensity parameter, which may be based on one or more of the following: minimum detected brightness (or intensity, e.g., of the light or of an image formed by the camera), the maximum detected brightness, or an average detected brightness. A light intensity parameter may also be based on noise levels within the camera image (the noise levels tending to fall as the light intensity increases) or on a selected ISO level by the camera imaging circuit (e.g., a light sensitivity level based on an International Organization for Standardization process). The camera data may include a detected light intensity parameter, and the controller may be configured to adjust the light emission profile of the arrangement of light-emissive elements based on the light intensity parameter, for example, to increase light intensity at the camera available for image formation.

Computing devices and systems described and/or illustrated herein may broadly represent any type or form of computing device or system capable of executing computer-readable instructions, such as those contained within the modules described herein. In their most basic configuration, these computing device(s) may each include at least one memory device and at least one physical processor. In some examples, a controller for a display wall may be or include one or more computing devices.

In some examples, a system may include a controller including at least one physical processor; and physical memory including computer-executable instructions that, when executed by the physical processor, cause the physical processor to modify a light emission profile of at least a portion of a display wall based on camera data, such as camera location data. In some examples, a non-transitory computer-readable medium includes one or more computer-executable instructions that, when executed by at least one processor of a controller, cause the controller to modify a light emission profile of at least a portion of a display wall based on camera data, such as camera location data. In some examples, the one or more computer-executable instructions, when executed by at least one processor of a controller of a display wall, may cause the controller to modify a light emission profile of at least a portion of the display wall based on camera data received from a camera directed towards a stage environment such that at least part of the display wall is within a field of view of the camera. In some examples, the controller may reduce the brightness and/or resolution of the portion of the display wall that is not within the field of view of the camera, and/or increase the brightness and/or resolution of the portion of the display wall that is within the field of view of the camera.

In some examples, a display wall may be adjusted using a plenoptic camera (sometimes termed a light field camera) which may provide data related to both light intensity and light direction at the camera. Light directions may be adjusted by adjusting the beam directions from portions of the display wall, for example, using the controller. In some examples, a controller may be configured to receive light intensity and beam direction data from a plenoptic camera and use light intensity and beam direction data to adjust the light emission profile of at least a portion of the display wall.

In some examples, a display wall may include one or more manual controls, such as a lever or other handle arrangement configured to reorient a display panel. Examples include providing mechanical control of light projection elements (which may also be termed light-emissive elements) in a display wall, such as an LED wall. In some examples, a display wall may include a plurality of display panels. One or more of the display panels may include a mechanical adjustment allowing the display panel to be turned to an arbitrary angle. For example, a handle may allow an arbitrary tilt (e.g., side to side and/or or up and down) to be imparted to the display panel. The display panel may rotate or pivot about a point and/or one or more axes.

In some examples, the light emission profile of a display panel or portion thereof may include one or more of a beam direction (such as a direction of maximum light emission intensity from the arrangement of light-emissive elements), a beam width (such as an angular distribution of light intensity emitted by the arrangement of light-emissive elements), a display brightness (such as a brightness of the arrangement of light-emissive elements, which may be an average brightness or a brightness standardized to display of a particular image), color (such as a color balance, gamut, or other color parameter). Color adjustments may be used to correct for color variations that may occur for viewing a display panel along a viewing direction with an appreciable angle to the beam direction. In this context, a viewing direction may be the direction for light reaching the camera from the display panel. The beam direction may be adjusted by the controller to be approximately parallel (or more parallel) to the viewing direction.

In some examples, a display wall may provide a set-up mode of operation. In the set-up configuration, each display panel may be used to display a light profile adjustment for the respective panel. A user may then rotate or otherwise adjust a particular display panel to obtain the suggested adjustment. For example, a user may use a handle to rotate a display panel to increase the proportion of light provided by the display panel that is received by the camera. The controller, or user, may determine which adjustments have the greatest effect. Suggested adjustments may be limited to those adjustments that provide benefits greater than a predetermined value (e.g., adjustments that provide an increase in light levels received by the camera above a predetermined value or proportion). Suggested adjustments may be limited to those that change the beam direction by greater than a threshold (e.g., a redirection of 5, 10, or 20 degrees or greater).

Advantages of light emission profile adjustments (manual or controller-based) may include greater freedom in the creation of the geometry of the display wall. If light from the display wall is more effectively directed towards the camera, lighting efficiency may increase and thermal issues (such as excessive heat generation) may be significantly decreased. In some examples, the beam width of light-emissive elements may be reduced, reducing the angular projection of light. In some examples, each display panel may be associated with a lever allowing adjustment of the panel orientation, relative to other elements of the display wall. For example, a display wall allowing adjustment of beam directions may be fabricated using LEDs having narrower angular light emissions (sometimes termed beam widths). For example, LEDs may have an angular width of light emission intensity (full width at half maximum intensity) of less than 100 degrees, such as approximately 90 degrees. In some examples, microlevers may be associated for each pixel of the light wall, which may be electronically controlled.

In some examples, each display panel has a lever extending from the back of the display panel. In this context, the front of the panel may be the face from which light is emitted. In some examples, the LED elements of a display panel may be fixed, and an adjustable sheet of lenses (e.g., microlenses) may be used to modify the beam direction. In some examples, a display panel (or arrangements of pixel elements within a display panel) may be housed in a steerable enclosure. The direction of light emission may be adjusted by adjusting the orientation of the steerable enclosure. In some examples, an actuator (such as a motor) may be used to drive beam direction adjustments, or optical elements (e.g., electrically tunable optical elements) may be used to change the beam direction (which may also be termed the projection angle) of the light.

In some examples, a display wall may include an arrangement of display panels, where each display panel of the arrangement of display panels may include a plurality of light-emissive elements. In some examples, a pixel may include one or more light-emissive elements. In some examples, the brightness of a display panel may be determined by a relative angle between the camera and the display panel. A display panel that is generally normal (e.g., square on) to the central axis of the camera field of view may have a lower brightness than a display panel that is angled (or oblique) relative to the camera. For example, if the beam direction from a display panel is generally parallel to a central axis of the field of view of the camera, the brightness of the panel may be lower than another panel for which the beam direction has an appreciable angle with the central axis of the field of view of the camera. In some examples, the arrangement of display panels may include first display panels having a first orientation and a first brightness, and second display panels having a second orientation and second brightness, where the first and second orientations are different, and the first and second brightnesses are adjusted so that the apparent brightness of each panel in corresponding camera image data is at least approximately equal. For example, the brightness may be based on the orientation of the panel relative to the camera, for example, based on the subtended angle of view of the display panel at the camera, or based on the angle ($\theta$) between beam direction from the panel and the central axis of the camera field of view. For example, the brightness may scale as $1/\cos(\theta)$ (or other function), being greater for larger oblique angles. Panels may be arranged to have different orientations (e.g., rotated relative to each other along one or more axes of rotation), for example, to reduce sound reflections from the display wall. In some examples, the arrangement of display panels may include first display panels having a first orientation and a first beam direction, and second display panels having a second orientation and a second beam direction, where the first and second orientations are different, and the first and second beam directions are adjusted so that the perceived brightness of each panel based on corresponding camera image data is at least approximately equal. For examples, the beam directions from each panel may be configured (e.g., with prisms, lenses, or other optical elements) to be generally parallel to each other and directed towards the stage (e.g., towards a camera location).

Example display walls (e.g., LED walls) using one or more of the described approaches may be more power efficient. In some configurations, the display wall may be configured so that there is no crosstalk between display panels shining light on each other. For example, beam directions from a portion of a display wall may be configured so that they are not directed towards another portion of the display wall, even if the portions are facing each other.

An exemplary computer-implemented method for controlling an LED wall may include displaying a background image on a display wall, receiving camera data from a camera, and adjusting the light emission profile of light-emissive elements within the display wall based on the camera data. The camera data may include camera location data, camera direction data, signal level data, or other suitable data. In some examples, camera location data may be determined from the image signal provided by the camera. In some examples, camera location data may be provided by one or more position sensors associated with the camera. Method steps may be performed by any suitable computer-executable code and/or computing system. In some examples, one or more of the steps of an example method may represent (or be performed by) an algorithm whose structure may include and/or may be represented by multiple sub-steps.

In some examples, a controller may track a position of a camera using one or more position sensors. In some examples, the controller may receive position signals from one or more position sensors that may be placed at various locations. Position sensors may include one or more of optical sensors, ultrasound sensors, wireless sensors, and/or other appropriate sensors. In some examples, one or more display panels may be associated with (e.g., support) a position sensor that may provide a sensor signal representative of a camera location relative to the display panel. In some examples, a sensor signal may allow determination of a direction (e.g., represented by one or two angles) from the sensor to the camera, and the controller may be configured to adjust the beam direction from the panel along the direction to the camera. In some examples, a position sensor may receive a signal from wireless device associated with the camera (e.g., wireless a beacon and/or transponder located on the camera). In some examples, one or more image sensors may be located proximate the stage environment and used to determine the location of the camera. In some examples, a stage environment may include or otherwise be associated with positional markers, such as grid coordinates, that may allow a camera location to be determined automatically or by a user.

In some examples, a system may include a plurality of cameras. In some examples, a method may include: selecting a first camera; using a controller to select first light emission profile adjustments based on a first location of a first camera; selecting a second camera; and using the controller to select second light emission profile adjustments based on a second location of the second camera. The method may be extended to the use of other cameras. In some examples, a plurality of light emission profiles for a display wall may be stored in a memory of the controller, and one of the plurality may be selected based on an identity and/or location of the camera.

In some examples, display walls may show appreciable color balance variations with viewing angle. In this context, the viewing angle may be the angle between the beam direction from a display wall (e.g., the direction of maximum light emission, or the central or principal beam direction) and the beam of light emitted from the display wall that is detected by the camera. In some examples, adjustment of the light emission profile may include a reduction in the effective viewing angle at the camera. For example, using a conventional display wall, a camera may be positioned to receive light at a first viewing angle relative to the display wall. However, by adjusting the beam direction from the display wall to be directed generally towards the camera, the camera then may receive light from a second viewing angle, which may be appreciably less than the first viewing angle. In some examples, the color balance of the image received by the camera may be improved by adjusting the light emission profile, such as the beam direction.

In some examples, a non-transitory computer-readable medium includes one or more computer-executable instructions that, when executed by at least one processor of a controller of a display wall, cause the controller to modify a light emission profile of at least a portion of the display wall based on camera data received from a camera located proximate a stage environment illuminated by the display wall.

Light emission profile adjustments, such as beam direction adjustments, may be static (e.g., built into the display wall as fabricated) or dynamic (e.g., electrically or mechanically adjustable adjustments). Example display walls may include both static and dynamic light emission profile adjustments. For example, static adjustments may be used to remove visual artifacts that may arise from the configuration of display panels (e.g., to remove visual artifacts from corner regions). Static adjustments may also be used to improve the acoustic properties of display walls (e.g., reduction of sound reflections due to extended planar or uniformly curved regions). The mechanical orientation and beam direction (e.g., the principal light projection direction) may be decoupled from each other, allowing the mechanical orientations to be varied (e.g., to reduce sound reflections) while maintaining a desired arrangement of beam directions.

In some examples, light loss near corners and interfaces within a display wall may be reduced, for example, by modifying the light emission profile near corners or interfaces. In some examples, visual artifacts may be reduced or substantially eliminated by modifying light emission properties from panels near corners of the display wall configurations.

Visual artifacts may be eliminated by modifying light emission properties from panels near corners of the display wall configurations. Examples also include display wall geometries that may reduce acoustic recording problems, such as display wall portions (that each may include one or more display panels) with varying (e.g., periodic or random) orientations and compensatory beam direction modifications, such as display panels having a modified emission angular profile based on the orientation of the display panel.

Examples also include display wall geometries that may reduce acoustic recording problems, such as LED panels with varying (e.g., random) orientations and compensatory light emission profile modifications. Examples include LED-based display walls and other display wall technologies.

In conclusion, display walls, such as LED walls, may be used to display background images during film or video recording, and are generally used with a real-world stage. Using a conventional LED wall, much of the light may not reach the camera and may be wasted. This may lead to excess heat generation and power inefficiencies. Also, conventional LED wall geometries, such as room-sized cubes or cylinders, may introduce visual artifacts into the background image. Examples of the present disclosure include LED walls with adjustable light emission properties that allow improved stage lighting, elimination of visual artifacts from the background image, and reduced heat generation from the LED panels due to reduced light wastage. Examples may allow adjustment of the light emission from individual LEDs and/or LED panels to direct a greater proportion of light towards the camera. LED emission angular profiles (which may also be termed beam widths) may be narrowed to further reduce light wastage. Examples include steerable panels and the use of lenses or prismatic sheets to redirect light from individual LEDs or LED panels.

Example systems described herein may perform one or more process steps in a variety of ways. In some examples, the camera may communicate with the controller for the display wall using wireless or wired communication protocols.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules or components described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive camera data to be analyzed and/or transformed, transform the camera data into an adjustment of a light emission profile of a portion the display wall, and output a result of the transformation as, for example, an actuator control signal or other electrical signal to modify a light emission profile of the portion of the display wall. For example, the results of the transformation may be used to energize an actuator, and/or to control an electrooptical device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a display wall comprising an arrangement of light-emissive elements; and
a controller, configured to:
receive camera data from a camera positioned to capture light emitted by the display wall, wherein the camera data includes camera location data; and
adjust a light emission profile of the arrangement of light-emissive elements based on the camera location data by modifying a direction of maximum light emission intensity from at least a portion of the display wall to increase an image brightness of an image captured by the camera, wherein:
the arrangement of light-emissive elements is located within a display panel;
the display wall comprises a plurality of display panels including the display panel; and
adjusting the light emission profile of the arrangement of light-emissive elements comprises adjusting an orientation of the display panel relative to the display wall in a manner that increases the image brightness of the image captured by the camera.

2. The system of claim 1, wherein the camera location data includes a location of the camera relative to the display wall.

3. The system of claim 1, wherein the arrangement of light-emissive elements comprises at least one light-emitting diode.

4. The system of claim 1, wherein:
the light emission profile includes a beam direction; and
the beam direction is the direction of maximum light emission intensity from the arrangement of light-emissive elements.

5. The system of claim 1, wherein:
the light emission profile includes a beam width; and
the beam width represents an angular distribution of light intensity emitted by the arrangement of light-emissive elements.

6. The system of claim 1, wherein the light emission profile includes a brightness of the arrangement of light-emissive elements.

7. The system of claim 1, further comprising an actuator, wherein the actuator is configured to adjust the light emission profile of the arrangement of light-emissive elements based on actuator control signals received from the controller.

8. The system of claim 7, wherein the actuator is configured to adjust a beam direction of the arrangement of light-emissive elements.

9. The system of claim 8, wherein the actuator is configured to adjust an arrangement of optical elements relative to the arrangement of light-emissive elements.

10. The system of claim 1, wherein the display wall comprises the plurality of display panels and the controller is configured to re-orient one or more display panels of the plurality of display panels based on the camera location data using an actuator.

11. The system of claim 10, wherein:
the actuator is configured to adjust an orientation of at least one display panel of the plurality of display panels; and
the arrangement of light-emissive elements is located within the at least one display panel of the plurality of display panels.

12. The system of claim 1, wherein:
the camera data further includes a detected light intensity parameter; and
the controller is configured to adjust the light emission profile of the arrangement of light-emissive elements to increase the detected light intensity parameter.

13. The system of claim 1, wherein the camera data further includes camera image data that identifies a part of the display wall that is located within a field of view of the camera.

14. The system of claim 13, wherein the controller is further configured to increase a brightness of the part of the display wall within the field of view of the camera.

15. The system of claim 1, wherein the camera data further includes camera direction data that includes a direction of the camera relative to the display wall.

16. The system of claim 1, wherein the camera data further includes a camera zoom parameter that includes a zoom setting of the camera.

17. A method, comprising:
receiving, at a controller of a display wall, camera data from a camera directed towards a stage environment such that the display wall is at least partially within a field of view of the camera; and
using the controller, modifying a light emission profile of a portion of the display wall based on the camera data, wherein:
the camera data includes camera location data;
the controller is configured to adjust the light emission profile of an arrangement of light-emissive elements within the portion of the display wall based on the camera location data by modifying a direction of maximum light emission intensity from the portion of the display wall to increase an image brightness of an image captured by the camera;
the arrangement of light-emissive elements is located within a display panel;
the display wall comprises a plurality of display panels including the display panel; and
adjusting the light emission profile of the arrangement of light-emissive elements comprises adjusting an orientation of the display panel relative to the display in a manner that increases the image brightness of the image captured by the camera.

18. The method of claim 17, wherein modifying the light emission profile of the at least the portion of the display wall comprises adjusting a beam direction of light from the arrangement of light-emissive elements within the display wall.

19. The method of claim 17, wherein modifying the light emission profile of the portion of the display wall comprises adjusting the orientation of the display panel of the display wall using an actuator.

20. The method of claim 17, wherein modifying the light emission profile of the portion of the display wall further comprises adjusting a brightness of the portion of the display wall based on an orientation of the portion of the display wall relative to the camera.

\* \* \* \* \*